United States Patent [19]

Brandestini et al.

[11] Patent Number: 5,612,794
[45] Date of Patent: Mar. 18, 1997

[54] LIGHT SOURCE FOR AN IMAGE READING DEVICE

[75] Inventors: Marco Brandestini, Kirkland; Richard F. Ferraro, Seattle, both of Wash.

[73] Assignee: Nikon Corporation, Tokyo, Japan

[21] Appl. No.: 438,498

[22] Filed: May 10, 1995

Related U.S. Application Data

[62] Division of Ser. No. 320,113, Oct. 7, 1994, which is a continuation of Ser. No. 973,819, Nov. 6, 1992, abandoned, which is a continuation of Ser. No. 619,663, Nov. 28, 1990, Pat. No. 5,191,406, which is a continuation-in-part of Ser. No. 511,649, Apr. 20, 1990, abandoned.

[51] Int. Cl.$^6$ .............................. H04N 1/04; H04N 1/46
[52] U.S. Cl. ........................................ 358/505; 358/509
[58] Field of Search ..................... 358/511, 515, 358/509, 505; 348/339, 336, 338; 359/634

[56] References Cited

U.S. PATENT DOCUMENTS

| | | |
|---|---|---|
| 3,883,852 | 5/1975 | Cotter . |
| 4,417,260 | 11/1983 | Kawai et al. . |
| 4,628,350 | 12/1983 | Aughton . |
| 4,651,226 | 3/1987 | Motoori et al. . |
| 4,803,561 | 2/1989 | Kubota . |
| 4,831,452 | 5/1989 | Takanashi et al. . |
| 4,873,569 | 10/1989 | Hirosawa .................. 358/511 |

(List continued on next page.)

FOREIGN PATENT DOCUMENTS

| | | |
|---|---|---|
| 0265362 | 4/1988 | European Pat. Off. . |
| 0300667 | 1/1989 | European Pat. Off. . |
| 63-182963 | 7/1988 | Japan . |
| 1-309460 | 12/1989 | Japan . |
| 3-145881 | 6/1991 | Japan . |
| 3-145883 | 6/1991 | Japan . |
| 3-169177 | 7/1991 | Japan . |
| 2217950 | 11/1989 | United Kingdom . |

OTHER PUBLICATIONS

"Nikon LS–3500 Scanner Has the Edge on Detail", MacWeek, Jan. 30 1990, 2 pages.
Marketing brochure for Barneywscan, 2 pages.
Marketing brochure for EIKONIX 1435 Slide Scanner, 4 pages.
Advertisement for JVC's KY–15CI, 1 page.
Advertisement for SCAN–T, 1 page.
Advertisement for TRIX, PolaRIX and ScanRIX software, 1 page.
Marketing brochure for Scanmaster Color Scanners by Howtek, 4 pgs.
Advertisement for Windows ColorLab I/P, 1 page.
Marketing brochure for MSF–300Z Scanner by Microtek, 4 pages.
Marketing brochure for Truvel TZ3BWC Color Scanner, 2 pages.

*Primary Examiner*—Scott A. Rogers
*Attorney, Agent, or Firm*—Flynn, Thiel, Boutell & Tanis, P.C.

[57] ABSTRACT

A scanner system digitizes 35 mm transparencies or negatives, and converts the image to a format compatible with popular microcomputer systems. This scanner system can accommodate various formats, and has variable zoom, pan and window size. Color separation is accomplished by an illumination arrangement causing rapid sequential generation of red, green and blue components. A low wattage light source is used, and color balance is achieved by adjusting the respective exposure times of the three primary colors. The system has internal calibration to achieve repeatable color balance. The system implements a wide variety of color coding schemes ranging in resolution from 1 to 24 bits. An adaptive process compresses the data in order to optimize the color selection process. The illumination optics are anamorphotic for high efficiency. Mechanical and electrical interfaces are compatible with a conventional 5¼" floppy disk drive standard.

4 Claims, 14 Drawing Sheets

U.S. PATENT DOCUMENTS

| | | |
|---|---|---|
| 4,879,595 | 11/1989 | Niki . |
| 4,918,537 | 4/1990 | Mori et al. . |
| 4,926,249 | 5/1990 | Ichihara et al. . |
| 4,961,118 | 10/1990 | Ueda et al. . |
| 5,034,756 | 7/1991 | Taira . |
| 5,125,047 | 6/1992 | Ito et al. . |
| 5,196,950 | 3/1993 | Furora . |
| 5,235,437 | 8/1993 | Katagari et al. . |
| 5,239,394 | 8/1993 | Stephenson . |
| 5,371,614 | 12/1994 | Ito . |

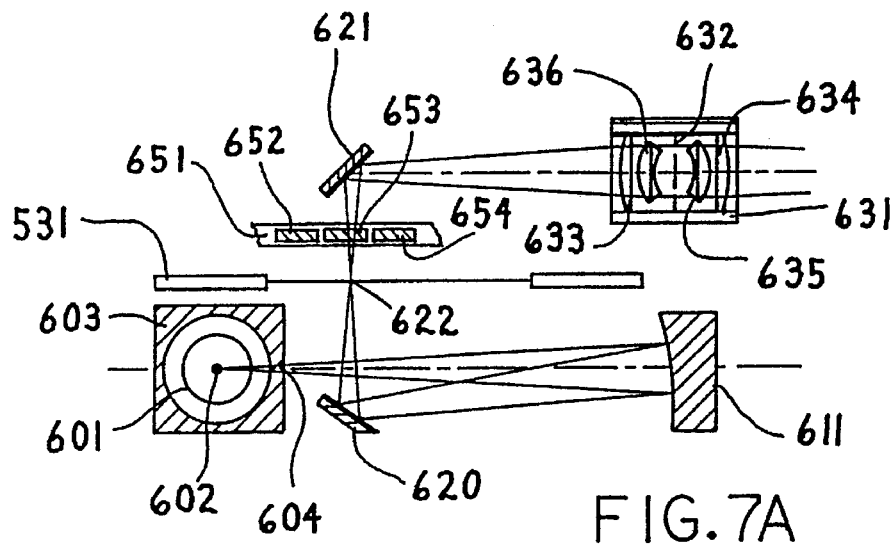
FIG. 7A
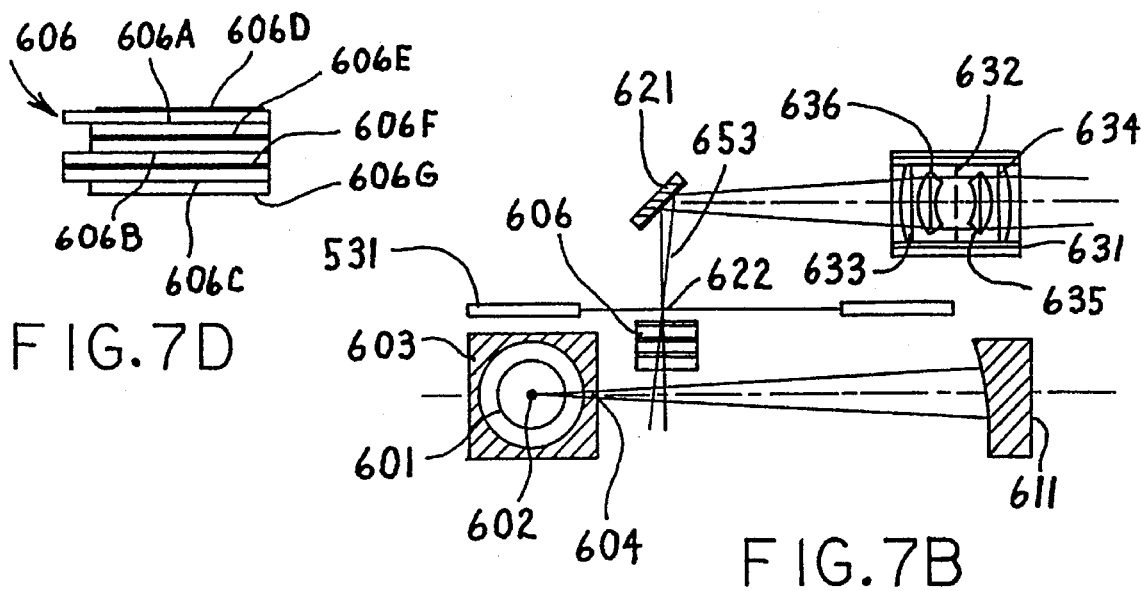
FIG. 7D
FIG. 7B
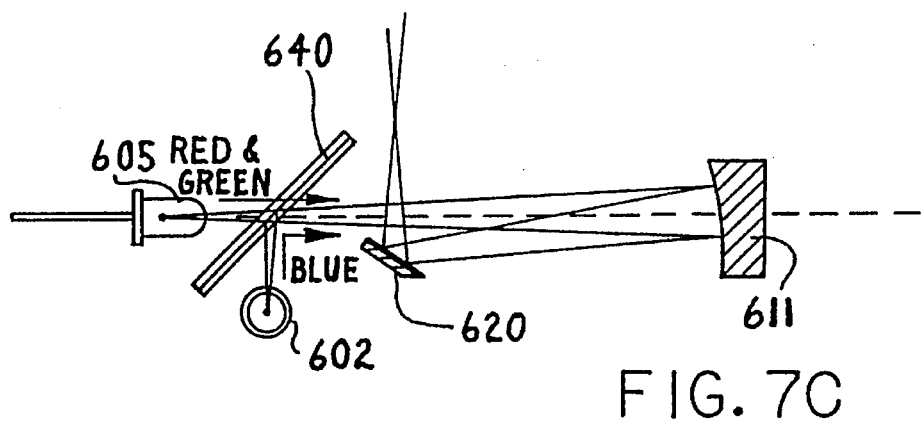
FIG. 7C

LIGHT SOURCE FOR AN IMAGE READING DEVICE

This application is a divisional of U.S. Ser. No. 08/320,113, filed Oct. 7, 1994, which is a continuation of U.S. Ser. No. 07/973,819, filed Nov. 6, 1992, which is a continuation of U.S. Ser. No. 07/619,663, filed Nov. 28, 1990 (now U.S. Pat. No. 5,191,406, issued Mar. 2, 1993), which is a CIP of U.S. Ser. No. 07/511,649, filed Apr. 20, 1990 (now abandoned).

FIELD OF THE INVENTION

This invention relates to a method and apparatus for digitizing 35 mm transparencies or negatives and, more particularly, to such a method and apparatus implemented in a compact and inexpensive system component capable of being installed in a standard half-height disk drive bay in a conventional personal computer.

BACKGROUND OF THE INVENTION

With the growing popularity of personal computers, a variety of applications address the needs of the graphics industry. Documents of all kinds are being converted to digital data which is manageable by electronic devices. Graphics has inundated the PC (personal computer) marketplace in the last ten years, due to the implementation of low cost, high-density memories, VLSI graphics controllers, graphics monitors, graphics standards and graphics applications software.

The PC user operates in a monochrome or color graphics platform, depending on the application. Cost used to be significant, and forced the low-end graphics user to select a monochrome system, but recent low-cost color systems have now virtually eliminated this limitation. Within the color marketplace, there are the standard color formats applicable to both the low-end mass marketplace and the high-end specialty marketplace.

The first category typically involves about $500 to $800 for a color graphics card and monitor, and the vast majority of color PC users fall into this category. The second category can involve between $6,000 and $10,000, and only specialty users can justify this cost. Currently, color scanning is available basically for the second of these categories, because it requires high spatial resolution (1024×768) and high-color resolution (24-bit true color) to handle the large data rates. It is a principle goal of the present invention to provide color scanning to the low-end color graphics user.

Relevant popular applications of graphics include illustrations, presentations and publishing. These three applications were each based in large part on the availability of input data and output hard copy technology. The introduction of black and white scanners brought a personal touch to these three applications which was previously impossible. Even more dramatic was the introduction of low-cost laser printers. With these, a user can input data from conventional sources and output it to hard copy, all with an affordable desktop system.

The richness of color was predominantly ignored, due to the unavailability of color images and the expensive printing costs. Now, however, color printers are becoming available at affordable costs, and consequently color scanners are becoming popular. The enormous body of color photographs had remained untouched, due to the costs. This is changing, and those same applications which could afford black and white scanners and laser printers will soon be able to afford color processing. These users will want and need access to color images, and in particular will want to access the images stored on color slides.

Currently, the three graphics applications mentioned above rely on clip art, but current clip art libraries pale in comparison to the images available on 35 mm color slides. An inexpensive slide scanner is essential for users who wish to access these color images. A graphics user can currently get several clip illustrations on a single floppy disk, due to the fact that the binary image format is relatively non-data intensive. A 320 by 200 pixel black and white image can be stored in 8000 bytes. Unfortunately, this is not the case for color images. Currently, a 24-bit color image of the same size would require 192,000 bytes. At current digital storage densities, access speeds and costs, it would not be practical for graphics users to utilize color images in digital formats, especially when one considers that a full page image of 3600 by 2400 pixels requires about 26 megabytes whereas the maximum storage currently available on a standard floppy disk is only 1.44 megabytes.

In order to utilize these color images, it will be necessary to store these color images in their native format, namely on 35 mm color slides. Each slide is small and very inexpensive to reproduce and store. A single standard 120 slide carrousel could store over 3 gigabytes of information. Furthermore, the slides retain their data with minimal care. An inexpensive slide scanner is therefore an absolutely necessary component in the graphics user's computer system.

There are several color scanners currently available on the market which are capable of scanning transparencies, but none of these scanners address the needs of the low-end market. By far the greatest majority of PC users operate with 8-bit color graphics cards and desire a scanner which is simple to use, compact, reliable and inexpensive. A user would not be likely to spend as much money on a slide scanner as was spent on the entire computer system. In addition, it is highly desirable for the scanner to actually mount within the PC, to reduce desktop clutter. Although flexible and powerful, current transparency scanners are expensive, and are designed with a physical size which cannot practically be made sufficiently compact to fit within a conventional PC. Albeit, these allow a wide range of sample size formats (for example from a 35 mm slide transparency to an 8.5 by 11 inch opaque), but at a cost which is unrealistic to the end user. An object of the present invention is to provide a compact and inexpensive system especially designed for a particular size application (for example 35 mm transparencies).

Objects of the present invention include provision of a scanner system which can generate a digital image from a transparency, which is compact, reliable, flexible and inexpensive, and which facilitates computer-based illustration, artwork, presentation graphics, desktop publishing and image database management.

A further object is the provision in the system of capability to directly digitize, store and display images without the need for any intermediate image storage, such as in solid-state or magnetic storage media.

A further object is the provision of capability to display an image with minimal delay, and preferably to effect a full color scan digitizing 480×640 pixels in less than ten seconds from the moment a slide starts to move into the system.

It is another object to allow a user to vary the magnification and the location of the image origin (zoom and pan capability), the zoom factor not being limited to integer multiples of the pitch of a solid-state image sensor and the zoom not being implemented in software.

A further object is the provision of a mechanical chassis with the size and shape of a conventional floppy disk drive so that the scanner can be directly installed in a conventional personal computer frame, wherein transparencies or negative strips are inserted into the system through an opening in its front panel, and power requirements of the scanner are met by the internal power (5 Volt, 12 Volt, 20 Watt maximum) supplied in popular computer systems for use by peripherals.

A further object is to provide a system which is self-calibrating, and does not require extensive warm-up periods or set-up procedures.

A further object is the provision of a program for the host computer which controls the scanner and allows an operator to interact with the scanning process, and which preferably establishes a windowed environment which allows the operator to open and close files, edit existing images, modify the layout of the window environment, control the color coding, and control the scanner.

SUMMARY OF THE INVENTION

The objects and purposes of the invention are met by providing a method for rapid digitization of a transparency using an illumination system, an optical image forming arrangement, and a linear solid-state detection arrangement to achieve high resolution, color separation, and sizing of the image to any desired scale, including the steps of: moving the transparency at selected rate in a first direction, thus defining the scale factor in a first dimension; sampling the image data obtained through the solid-state detection arrangement at a selected sample rate in a second dimension; defocusing the image to adjust the spatial bandwidth to the selected sample rate; acquiring a sequence of spectral bands for every line sampled; rapidly reducing the number of colors required to faithfully represent the original image; and compensating for non-uniformities of the illumination system and the detection arrangement.

The objects and purposes of the invention are also met by providing an apparatus for rapid digitization of a transparency, including: a light source, an optical image forming element, a linear solid-state detector, a digitization arrangement for providing high resolution and full color rendition and for facilitating sizing of the image to any desired scale, a variable-feed drive mechanism which establishes a scale factor in a first dimension; an element which provides adjustable defocusing; a rate multiplier which generates a variable scale factor in a second dimension; a color separation element which extracts different spectral bands from the light source; a programmable sequencer which controls the exposure times assigned to respective spectral bands; and an arithmetic unit to convert digitized values of respective spectral bands into a palette containing a reduced number of colors.

BRIEF DESCRIPTION OF THE DRAWINGS

A preferred embodiment of the present invention will be described below with reference to the accompanying drawings, in which:

FIG. 7A is a diagrammatic sectional side view of the optical components of FIG. 6, and shows a preferred arrangement to generate from an incandescent light source three spectral bands used for color separation;

FIG. 7B is a view similar to FIG. 7A but showing an embodiment which uses a liquid crystal device to generate the three spectral bands;

FIG. 7C is a view similar to FIG. 7A but showing an additional LED and a dichroic mirror to generate the three spectral bands;

FIG. 7D is a diagrammatic side view of a liquid crystal device which is a component of the arrangement in FIG. 7B;

DETAILED DESCRIPTION

While the apparatus and method described below are directly applicable to a variety of image digitization tasks, including different formats, monochrome films or even opaque originals, the preferred embodiment applies them specifically to the digitization of 35 mm color transparencies or negatives (which have a 24 mm×36 mm transparency therein).

Figure 1:
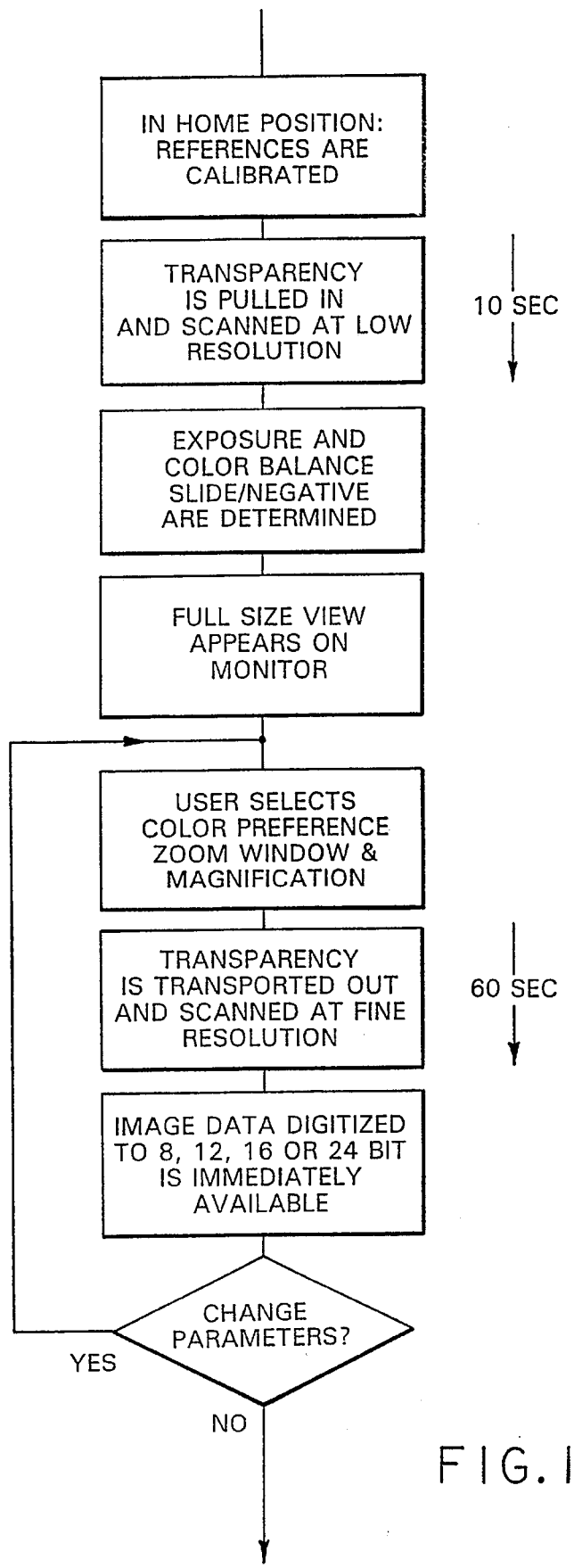
FIG. 1 is a flowchart representing an image digitization process effected under operator control.
Figure 2:
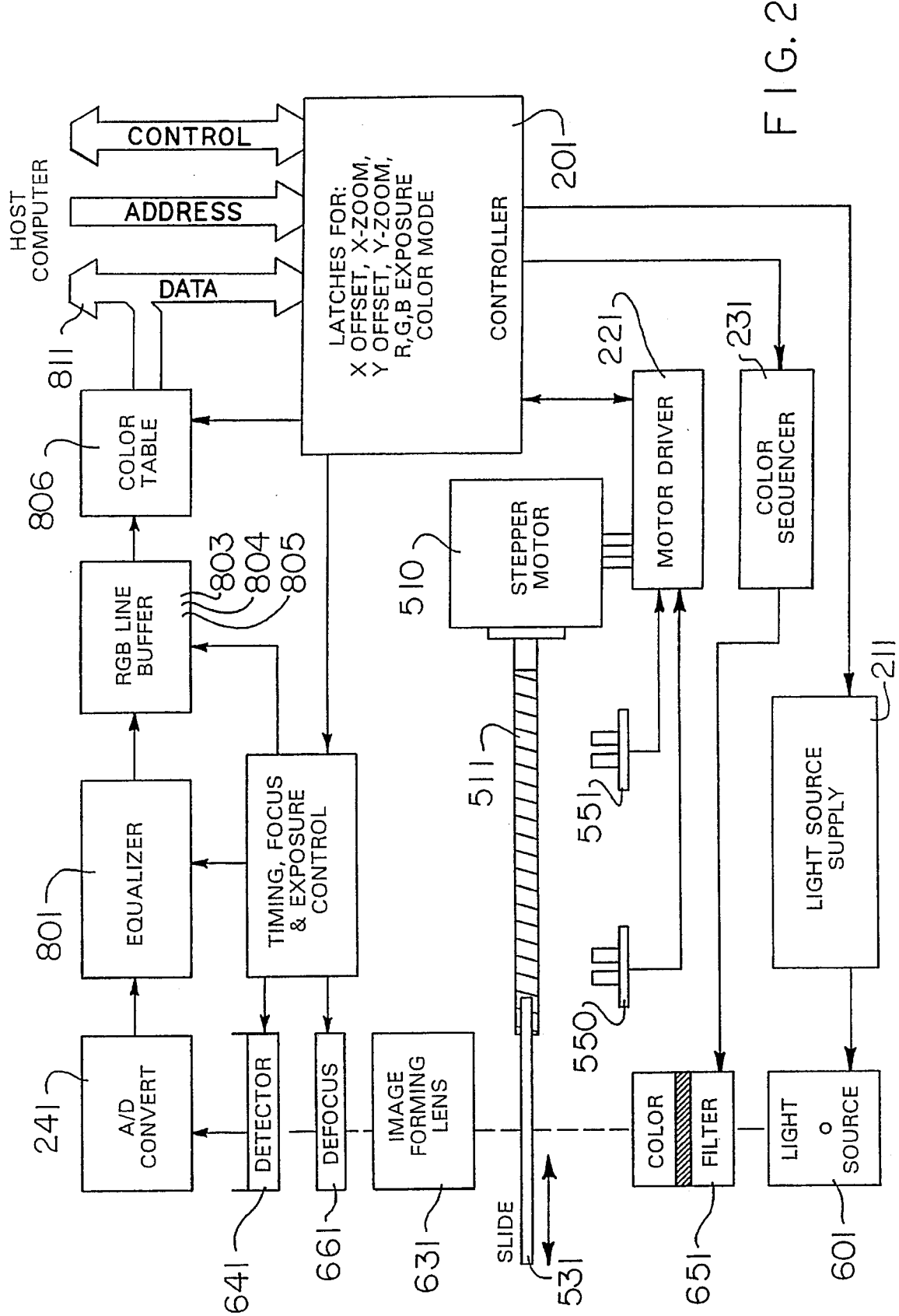
FIG. 2 is a block diagram of a system embodying the present invention.

Referring to FIG. 2, a block diagram of the inventive system is depicted, and shows the interaction of the various components in a diagrammatic fashion.

Figure 5:
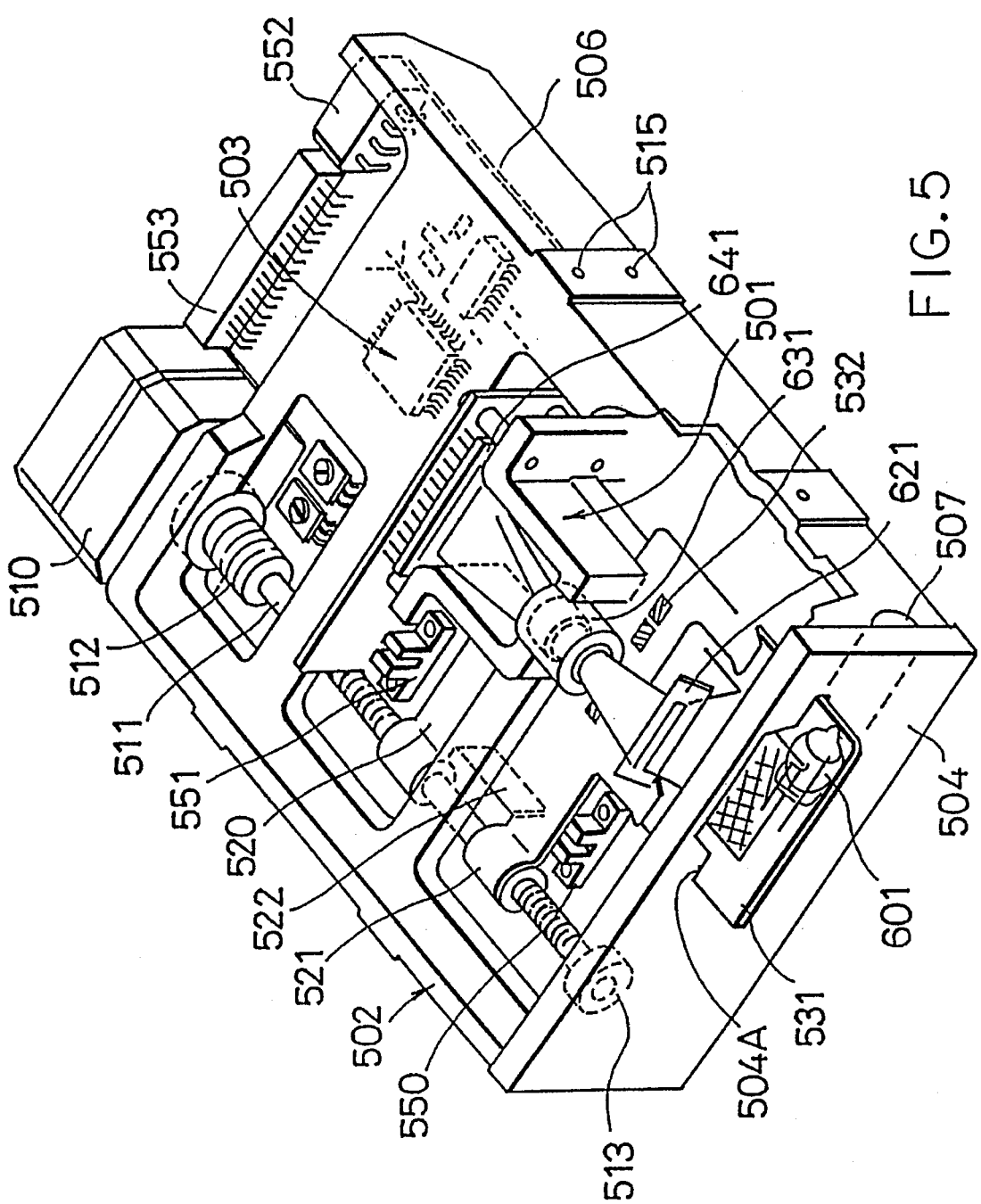
FIG. 5 is a diagrammatic perspective view of the preferred embodiment showing optical and mechanical components supported on a chassis mountable in a standard floppy disk drive bay.

Referring to FIG. 5, in the preferred embodiment the scanner is housed in a chassis 506 having the same dimensions as a standard half-height 5¼" floppy disk drive. The scanner can thus be mounted in a standard disk drive bay of a conventional personal computer. The front panel or bezel 504 has an opening 504A through which a slide or negative 531 clamped in a 2"×2" frame is inserted into the scanner. The scanner will pull the slide in as described in more detail below, thereby establishing optimum exposure and color balance. Generally a preview scan is accomplished as a first pass during pull-in, yielding a full size representation of the image in less than 10 seconds. The amount of storage space for this image is 300 kbyte for a 480×640 pixel 8-bit color (or monochrome) image. The operator selects the portion of the image to be scanned at a higher resolution, and defines the appropriate scale factor (the number of pixels in X and Y directions). The slide is then rescanned, the highest possible resolution being 2400×3600 pixels capturing the entire image. If 24-bit color digitization is chosen, this yields 27 Mbyte of uncompressed image data.

Mechanical Design

Attention is now drawn to FIG. 5. An optical portion 501, a mechanical portion 502 and an electronic portion 503 are supported by a chassis 506. The optical portion 501 is described in detail below with reference to FIG. 6. The mechanical portion includes a conventional stepper motor 510 mounted on the chassis 506 and driving a lead screw 511 by means of a conventional flexible coupling 512. The lead screw 511, which is rotationally supported at a front end on chassis 506 by a front bearing 513, positions a movably supported slide tray 520 which has two nuts 521 engaging the screw 511. The pitch of the thread of screw 511 is 1 millimeter. The motor 510 features 200 half steps per revolution. A resolution of 5 microns is thus achieved by the positioner.

Figure 5A:
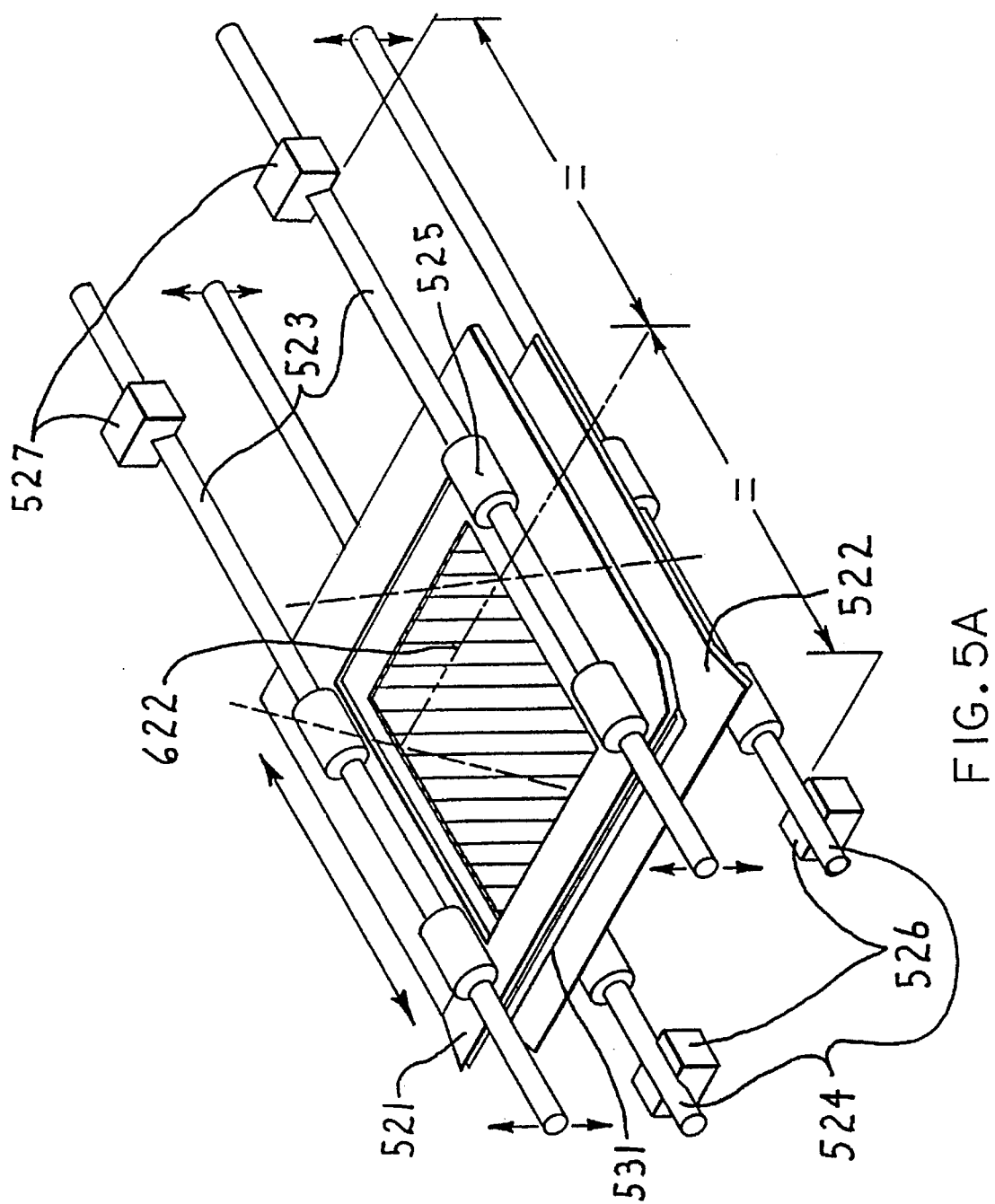
FIG. 5A is a sectional side view of a slide tray mechanism which is part of the apparatus of FIG. 5.

The slide tray 520 grips a slide 531 without obstructing the transparency in it in order to permit passage therethrough of an optical beam. Referring to FIG. 5A, the slide tray 520 includes upper 521 and lower 522 shells or frames. The shells slide on polished rods 523 and 524 by means of small bronze bushings 525. The lower rods 524 each pivot about a support 526 located at the front end of the mechanism. The upper rods are each supported by a bearing 527 at the back end. The supporting bearings are spaced equal distances from the focus line (indicated at 622). A thin slide thus travels slightly upward when being pulled in, a thick one slightly downward. The line of the slide being scanned at any time, however, is kept in focus.

As shown in FIG. 5, the extreme positions of the slide tray 520 are detected by front 550 and back 551 optical limit switches actuated by a lip 522 protruding from the tray. The limit switches are conventional components. The slide 531 is inserted into the scanner through a slot 504A provided in a bezel or front panel 504. The limit switches 550 and 551 are mounted on a printed circuit board 505, which holds all the analog, digital and power electronics. The unit connects to the host computer through a power supply connector 552 and an interface connector 553 provided on the circuit board. The chassis 504 has threaded holes 515 which facilitate mechanical installation inside a personal computer frame.

Note that there is a passage providing enough clearance to receive negatives which are four or five images long.

Figure 6:
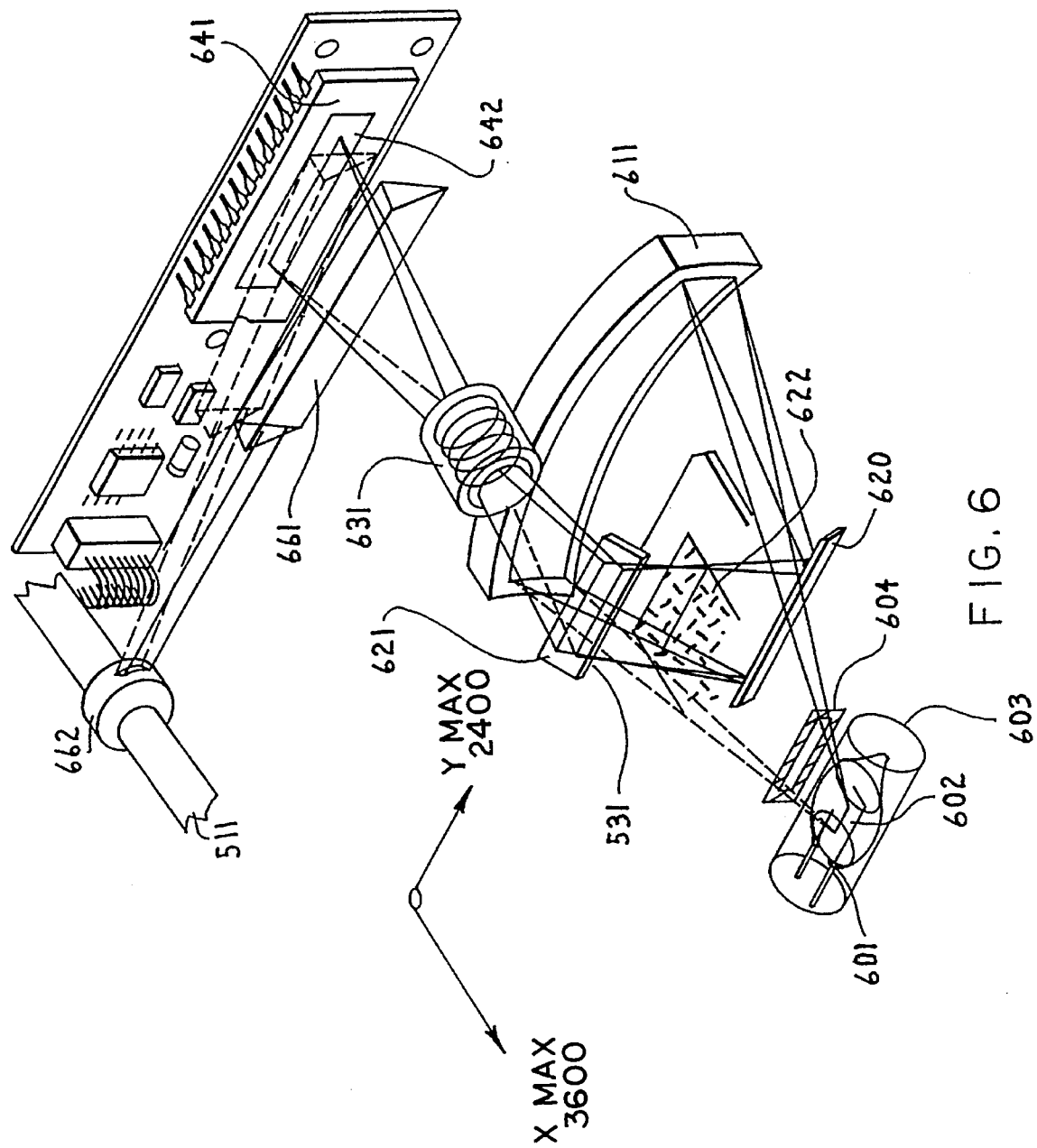
FIG. 6 is a diagrammatic perspective view of the optical components of the preferred embodiment which illuminate and image a transparency on a line-by-line basis.

The components of the optical portion 501 are shown in FIG. 6, and include: a conventional light source 601, a toroidal mirror 611, an upper folding mirror 621, a lens assembly 631, and a conventional CCD sensor 641 for the image forming path.

Referring to FIG. 5, the mechanical operation of the unit is as follows: The slide tray 520 is disposed in a front or "home" position. A slide 531 is inserted by the operator, and the operator then presses a key on the computer keyboard which causes the software to effect a scanning operation. First, the scanning software executed by the host computer activates the light source 601. With the tray 520 in the home position, a set of reference filters 532 for color and density are positioned in the optical path 540. (Alternatively, the reference filters could be pushed out of the optical path as the slide is inserted.)

The reference filters let the system establish a reference for color balance and exposure. By scanning the reference filters, the color balance can be obtained, because the characteristics of the filters are preset. This color balancing operation is preferably done before each scan, because the temperature and age of the filament play a role in establishing color temperature. The balancing program reads intensities from each of the three color filters. Averaging over several pixels is preferably used for the reading for each filter. The routine compares the three resulting values against a standard set of R/G/B (red/green/blue) values. It then loads the equalization RAM 801 in FIG. 8, such that the three colors are properly balanced (as discussed in more detail later).

The motor 510 then pulls the tray 520 carrying slide 531 in, at a rate determined by a selected zoom factor discussed later. A first scan is done during pull-in and is used by the program to optimize the color palette. When slowly moving the slide out again, a second scan is performed which applies the optimized data. When in the home position, the slide 531 can be easily removed from its tray 520.

In a modified mechanical arrangement (not illustrated), the slide tray 520 has an extended path of travel which enables it to pick slides from an external cartridge or carrousel and, after scanning them, reinsert them into this container. Such a system is useful for the efficient digitization of large collections of image data.

Illumination Optics

FIG. 6 shows the illumination and image forming optics used in the preferred set-up. The purpose of the illumination optics is to generate a narrow line of concentrated light onto a line or swath 622, the line of light remaining basically stationary so that movement of the slide causes the line of light to progress across the transparency. This feature makes the most efficient use of the light source, resulting in a compact and low-wattage system. A requirement is that the light bundle converge and fill the aperture of the image forming lens 631.

The selection of a line focus 622 rather than a point focus calls for a non-spheric design. Since a primary goal is compactness, the light beam has been folded (reflected) several times.

In FIG. 6, the light source 601 includes a tungsten halogen lamp with an axial filament 602. A Philips 13078 or Osram 64425AX (both 12 V 20 W) are acceptable choices. The light bulb is centered in an essentially cylindrical housing 603 having a cylindrical internal surface which is coated with a highly reflective layer. This scheme back-images the filament onto itself and results in a very efficient source. An exit slit 604 is machined into the side of the housing 603 facing the convex toroidal mirror 611. The lamp is driven with a voltage 10% below its rated voltage to increase its lifetime. Since a typical bulb is rated for 1000 hours at the specified supply, it should not be necessary to change it during the life of the product. Bulb change is possible, however, through an opening 507 in the chassis 506. In FIG. 6, the lamps used must be checked for proper filament centering.

The light from bulb 601 exiting slit 604 travels to mirror 611 and is reflected and focused, is then reflected by mirror 620 and converges to a line on the transparency at 622, then travels to and is reflected by mirror 621, travels through image forming lens 631, and is focused as a line on sensor 641.

The convex mirror 611 is of special design, and has two axes of curvature. In the sagittal aspect, a point focus on the slide 531 is required. This means that the mirror has to image the filament 602 onto the surface of the slide 531; the radius of curvature r of this axis for the curved mirror is given by:

$$2/r = 1/a' - 1/a \text{ (paraxial approximation)}$$

(where a' is the distance from the filament to the mirror, and a is the distance from the mirror to the slide).

Tracing the rays beyond the object (slide) plane illustrates that, if the working distance and the aperture of the objective are matched to the illumination geometry, the light bundle fills or slightly overfills the aperture 632 of the image forming lens 631.

Looking from the meridional aspect, the situation is substantially different. Here the filament 602, which is about 3 millimeters long, must produce a concentrated line of light 622 uniformly illuminating a swath which covers the entire height of the slide (24 mm). Again, the bundle must also converge and fill the aperture of the image forming lens 631. The mirror must thus image the filament into the aperture 632 (FIG. 7A) of the objective similar to the arrangement of a microscope condenser. The radius of the toroidal mirror for this axis of curvature is given by the same formula set forth above, except that here a stands for the distance from the mirror to the aperture of the imaging lens 631.

The fabrication of the mirror 611 is achieved by diamond turning the part from an aluminum blank. The resulting ring can be split into sectors, thereby yielding six parts per ring. Since the curvatures in both axes are circular arcs, an appropriate numerically controlled lathe can fashion the desired geometry. After machining, the surface must be polished to a high gloss and then silver-coated for optimum reflection in the visible spectrum. Instead of turning the mirror itself, the same machine can be programmed to shape a negative image of the mirror, which can act as a mold to replicate the mirror using any suitable casting method. Electro forming can be used as an alternate manufacturing process.

The toroidal mirror 611 is incorporated in the illumination system with a certain amount of tilt. This tilt and the associated decentering can be optimized to compensate for spherical and other aberrations of the toroidal mirror.

A lower first-surface mirror 620 reflects or folds the beam in order to reduce the package size.

Image Forming Optics

The image forming optics are spherical and of conventional design. The light, after passing through the slide 531 at a line focus 622, is directed to the imaging lens 631 by the upper first-surface mirror 621. As shown in FIGS. 7A–7C, the imaging lens 631 is symmetrical and has two identical outer elements 633 and 634 and two symmetrical doublets 635 and 636. The aperture stop 632 is located at the center of the system. The system features near diffraction limited resolution across the entire field of view.

It should be noted at this point that, while the illumination optics produce a light bundle which just fills the aperture of the image-forming lens, in actuality the beam will be wider. This is due to the scattering of light which occurs at the individual grains of the film, which are a few microns in size. The aperture of the image-forming system can thus be somewhat larger than that of the illumination system, which is advantageous. Typically the amount of light lost due to scatter is on the order of 50%.

The line image is formed on the CCD sensor 641 (FIG. 6), which converts the detected intensity to a proportional analog voltage. All glass/air interfaces are anti-reflection coated in a known manner. The window 642 of the sensor 641 is designed to act as an infrared blocking filter.

The CCD sensor contains over 2400 elements arranged in a line at a 10 micron pitch. This resolution is a good choice since it closely matches both the resolution of typical film (typically 30 ... 50 line-pairs per millimeter for 100 ASA/21 DIN), and the resolution of the image-forming optics.

Color Separation

According to the goals set forth, it is desirable to generate the three primary colors in a rapid sequence, that is, a red/green/blue triple, for each scan line. (Other known scanning devices scan the image in three passes corresponding to the respective colors, requiring large amounts of memory and very accurate positional repeatability). This rapid sequence in the inventive arrangement entails some rather demanding mechanical characteristics.

Color separation could be accomplished by a spinning color wheel, which contains sectors of the appropriate filters. A wobbling tri-color filter arrangement, driven by a tuning fork mechanism, is an alternative. FIG. 7A shows an implementation of the latter, where a color separation filter arrangement 651 (different from the reference filters 532) is disposed in the image-forming path (as shown in FIG. 7A). Filters for red 652, green 653 and blue 654 primaries are a possible set. Filters can be of various types. Glass containing specific dyes is the preferred choice. Such filters are affordable and their transmission characteristics are independent of the angle at which the optical beam passes through them. Dichroic filters can be used for more stringent color separation applications. Dichroics, however, must be used in collimated portions of the beam to avoid noticeable color shifts at the edges of the image.

In another color separation scheme, the color separation filter arrangement 651 of the embodiment of FIG. 7A has been replaced in the embodiment of FIG. 7B with a sandwich 606 of liquid crystal cells and polarizers. In particular, referring to FIG. 7D, the sandwich element 606 has three liquid crystal cells 606A–606C, which respectively correspond to the three primary colors and are independently controlled, and has four polarizers 606D–606G. Such sandwich components are commercially available, an example of which is a part available from Tektronix of Beaverton, Oreg. (Part No. LCS100).

Since virtually all the light emanating from the source is directed onto the sensor, an interesting illumination concept becomes feasible.

In particular, solid state light emitting diodes can partly or wholly replace the incandescent filament/filter combination.

Diodes offer two distinct advantages over a filament or discharge lamp:

1. Their entire output energy falls into a well defined visible band, which makes them both efficient and stable sources.

2. Switching times for LEDs are typically in the microsecond range, ideal for generating the rapid red/green/blue sequence needed in the inventive system.

A very elegant approach for tri-color illumination has been devised using an incandescent source and using red and green LEDs. FIG. 7C shows this arrangement.

Source 602 is the incandescent lamp described above. Source 605 includes red and green LEDs, preferably a red/green array in a common housing. The dichroic mirror 640 combines the spectra radiated from the three sources. The rest of the illumination optics corresponds to the embodiment already described.

An important feature here is the switching scheme. The incandescent source provides the blue portion of the illumination (the other colors not being reflected by mirror 640) and is continuously on. Only the red and green LEDs are switched during an r/g/b cycle. One therefore obtains the following sequence: B, gB+G, rB+R, where g denotes the ratio of green vs. blue exposure time, and r denotes the ratio of red vs. blue exposure time. Blue is the only spectral band which is obtained pure.

The other components, which contain their primary plus a certain portion of blue, can, however, be processed by subtraction to yield the true primaries. Since the blue source intensity is only a fraction of the green and red (the blue exposure time therefore being significantly longer as explained elsewhere herein), no significant reduction in dynamic range for the red and green channels will occur.

Blue LEDs are new, but are commercially available from Siemens, Sanyo, Panasonic and Cree. It will be recognized that the source 602 in FIG. 2 could be replaced by two or more blue diode chips arranged in a row, thereby yielding a light source assembly which is completely solid state.

Figure 7F:
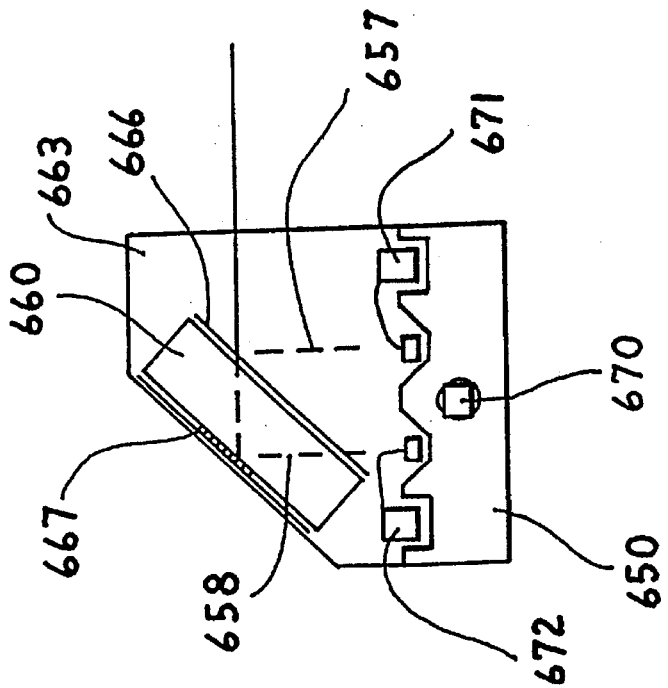
FIGS. 7E and 7F depict an alternative embodiment of the light source shown in FIG. 7C, FIG. 7E being a diagrammatic perspective view of part of the light source and FIG. 7F being a diagrammatic end view of the light source.
Figure 7E:
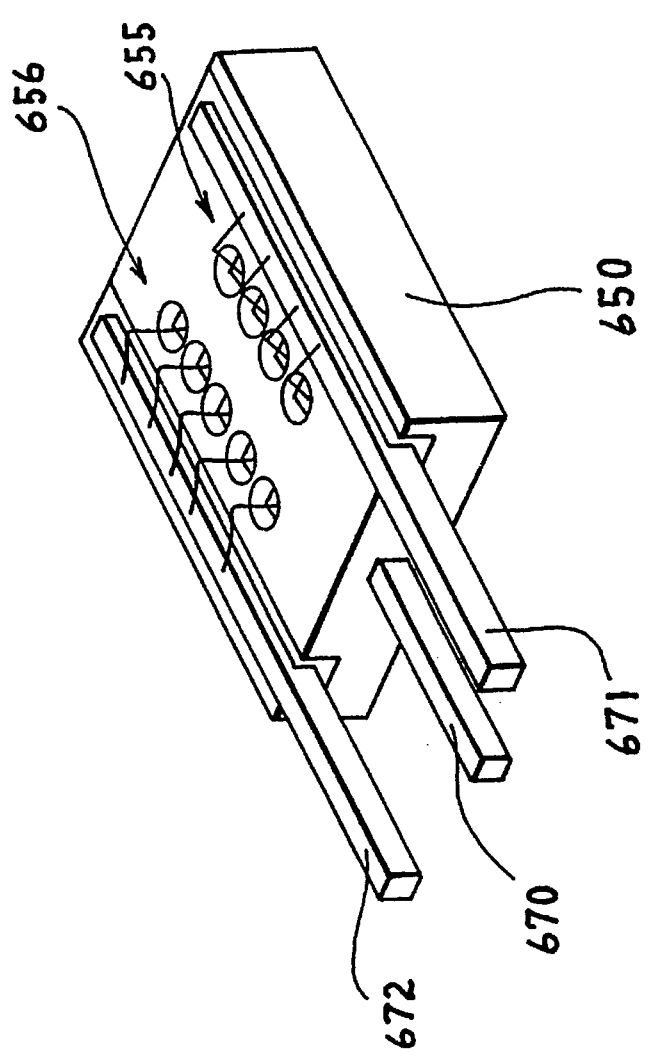

A further, more elegant implementation of the solid state light source of FIG. 7C is shown in FIGS. 7E and 7F, this source replacing the elements 602, 605 and 640 in FIG. 7C. In FIG. 7D, a plurality of blue, green and red 10×10 mil LED die are mounted in individual, reflective recesses arranged in two rows on a common conductive substrate 650, namely a row 655 of blue LEDs and a mixed row 656 of green and red LEDs. The length of each row is selected so that the image of the source fills the aperture of the imaging lens 631. It should be noted that the line-like source geometry is functionally similar to the elongate filament 602 of the incandescent bulb 601.

Since the blue LEDs exhibit the lowest intensity, there is one full row 655 of four elements of blue. Green and red are alternatingly arranged in a mixed row 656 of three green and two red elements. The toroidal mirror 611 will superimpose the individual swaths or beams of light 622 generated by respective LEDs. In order to combine the bands of red (660 nm wavelength), green (555 nm wavelength) and blue (470 nm wavelength), a dichroic mirror 660 is placed above the array. This mirror is similar to the mirror 640 in FIG. 7C, but with the addition of an aluminized back surface 667.

For optimum eficiency and ruggedness, the mirror 660 and the light source are encapsulated in optical grade epoxy 663, for example Hysol OS 2601 (Dexter Corp. Olean, N.Y.). The mirror 660 is a blue dichroic matched to the index of the encapsulant (n=1.56), and oriented at 45°. Such a mirror can be obtained from Balzers Corp. (Baizers, Liechtenstein), part DC blue special (cutoff wavelength 510 nm).

The majority of the blue light 657 is reflected at the first dichroic surface 666 of the mirror 660, while the red/green light 658 will pass that surface and be reflected from the back coated with the reflective aluminum layer 667. The separate bands combine at the front surface, so that, when looking into the light source, one sees a strip of essentially white light.

The assembly has three leads or electrodes, namely the common lead 670 which is connected to substrate 650, the blue lead 671 connected to the anodes of the blue LEDs, and the red/green lead 672 for the red and green LEDs. The LED elements are wire bonded to the electrodes. The red and green LEDs are oriented with opposite polarities, so that a bipolar current driver can use leads 670 and 672 to turn on each color separately.

Figure 9:
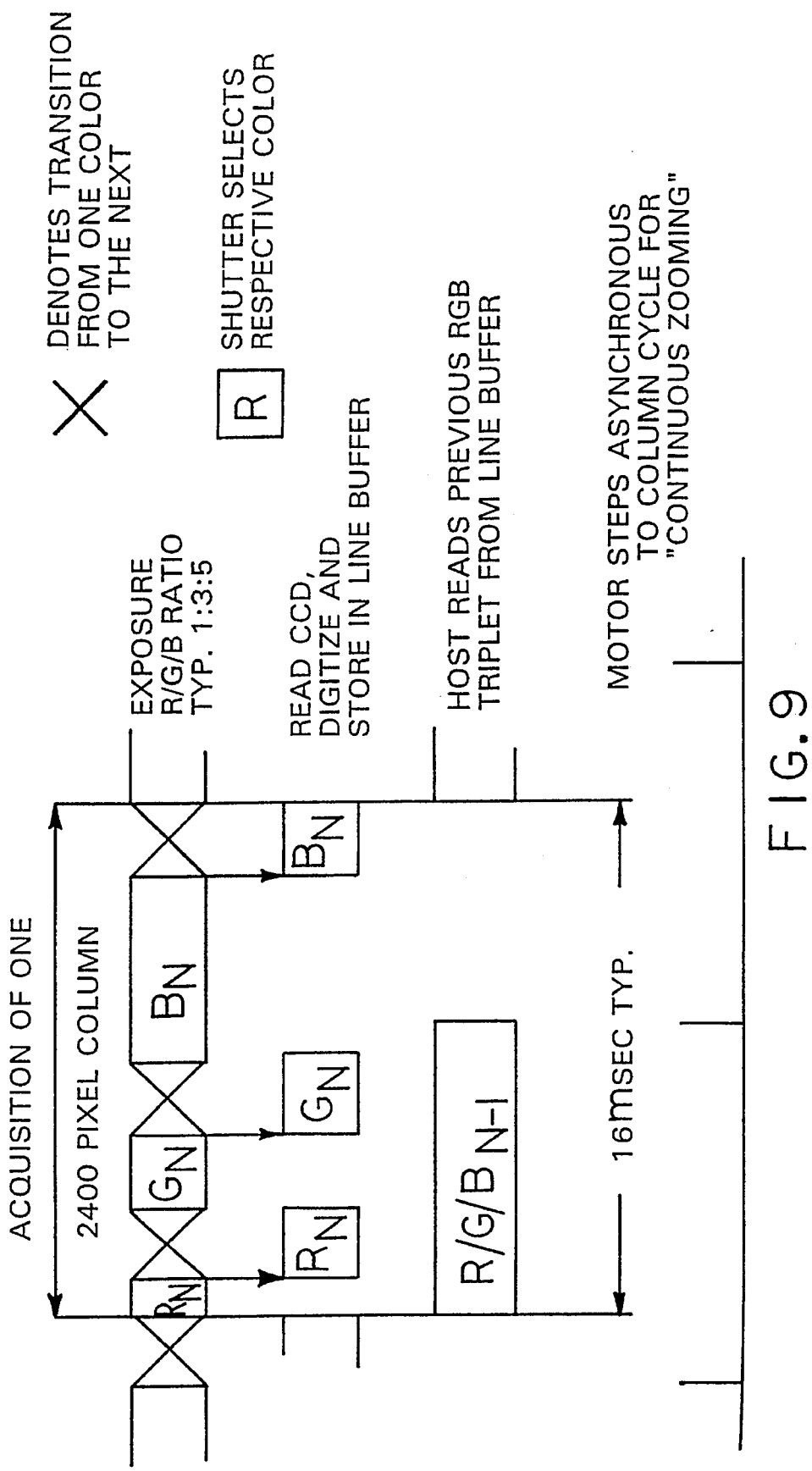
FIG. 9 is a timing diagram illustrating operation of the circuitry of FIG. 8.

The filter wobbler 651 of FIG. 7A, the LED 606 of FIG. 7B and the LED 605 of FIG. 7C must each be operationally synchronized to the CCD sensor 641 (FIG. 6). FIG. 9 is a timing diagram showing the basic synchronization required. Those of ordinary skill in the art are familiar with the specific circuitry necessary to effect synchronization. Therefore, and since the synchronization circuitry is not, in and of itself, a part of the present invention, it is not illustrated and described in detail.

Color Calibration and Equalization

For the sake of this description, separation into three primaries, namely red (typically 750 . . . 585 nm), green (typically 575 . . . 505 nm) and blue (typically 495 . . . 400 nm), is referred to. Separation into other bands can be advantageous for some specific applications.

Referring again to FIG. 7A, since the present embodiment is designed for small size and low power consumption, an appropriate light source had to be found. Conventional document scanners often utilize a fluorescent light source, with a spectrum close to daylight. Such a source, or a xenon or other discharge lamp, does not easily lend itself to the scope of the desired product.

Incandescent lamps, on the other hand, especially the newly available axial filament halogen lamps, offer a space and cost saving alternative. Typically, when using incandescent light for any color work, filters are used to shift the color temperature toward natural daylight. The Kodak Wratten 80A filter is a typical example. Unfortunately, filters accomplish a shift in color temperature by attenuation of the longer wavelengths. Any attenuation, however, is highly undesirable for a system featuring compactness and low power. Besides the spectral characteristics of the source, the response of the detector must also be considered. The conventional sensor 641 used here happens to be less efficient toward the blue end of the spectrum. When using multispectral lasers, or red/green/blue solid-state light emitting diodes, the same considerations apply.

The preferred embodiment therefore equalizes the relative intensities of the red, green and blue components by adjusting the exposure for each spectral band individually. This is done in the following manner.

The net amounts of light intensity for the three bands (red/green/blue) could, for example, have the ratio 10:2:1. This ratio accounts for the spectrum of the tungsten filament, the responsivity of the solid-state image sensor, and effects of the infrared blocking filter.

By allotting a 10 times longer exposure time interval to the blue and a 2 times longer exposure interval to the green in comparison to the red, this unbalance is compensated.

Such a coarse balance is necessary primarily to compensate for the spectrum of the incandescent source. A fine adjustment for proper color balance must also be provided. Typically, a system is adjusted to yield the desired white or flesh tone. Special effects can sometimes require a particular bias of the color balance.

Note that, since the same principle is equally applicable to digitize negatives, it must be able to compensate for the orange filter featured by negative films. In this case, the operator tells the system that a negative is being scanned and identifies the source of the negative, which determines the amount of orange. Compensation is again achieved by balancing the exposure times for the three colors. The exposure time allotted to "red" is further reduced when reading a negative. Since different processes use different hues of orange, the operator is asked to identify the specific brand and type of film of the negative, the system containing preset characteristic data for most popular films. Conversion from the subtractive to the additive color scheme is accomplished by the color lookup table.

Fine tuning of the three color channels in a conventional system is typically done after analog to digital conversion of signals from the sensor by means of an input scaling operation. This procedure has two drawbacks:

a) It introduces quantization artifacts, because the scale factor is not just a power of two. These artifacts can be lessened through all kinds of image post-processing. If the input is digitized at a high resolution (8 bits and more), losing the least significant bit can also be tolerated.

b) The second drawback of digital scaling has to do with dynamic range. In order to make the best use of the analog to digital converter, the input gain and offset should be set so as to use the full range of the A/D. Typically, however, one must leave some latitude to accommodate brighter than normal inputs, thus avoiding saturation. This precaution reduces the range of the converter. Secondly, if a darker image is digitized, the input signal is less than normal. Since the exposure for this particular color is fixed, one can only make up for the reduction in signal by adding gain in the digital section of the system.

Fortunately, the latest generation of solid state image sensors (for example, the LORAL/Fairchild CCD 181) can be timed so as to control the effective exposure. The respective timing waveform and drive signals can be found in the manufacturers data sheet describing this device, and are thus not described in detail here. For convenience, it is merely pointed out that three separate exposure registers or latches (included at 201 in FIG. 2 and shown at 1001–1003 in FIG. 10) are provided and are respectively assigned to the three primary colors. During each R/G/B exposure cycle, the appropriate register is read at the beginning of each color interval and used to control the exposure. The net amount of light gathered for each color is thus equalized. A programmable prescaler 1004 accounts for the coarse equalization of 1:2:10.

Figure 10:
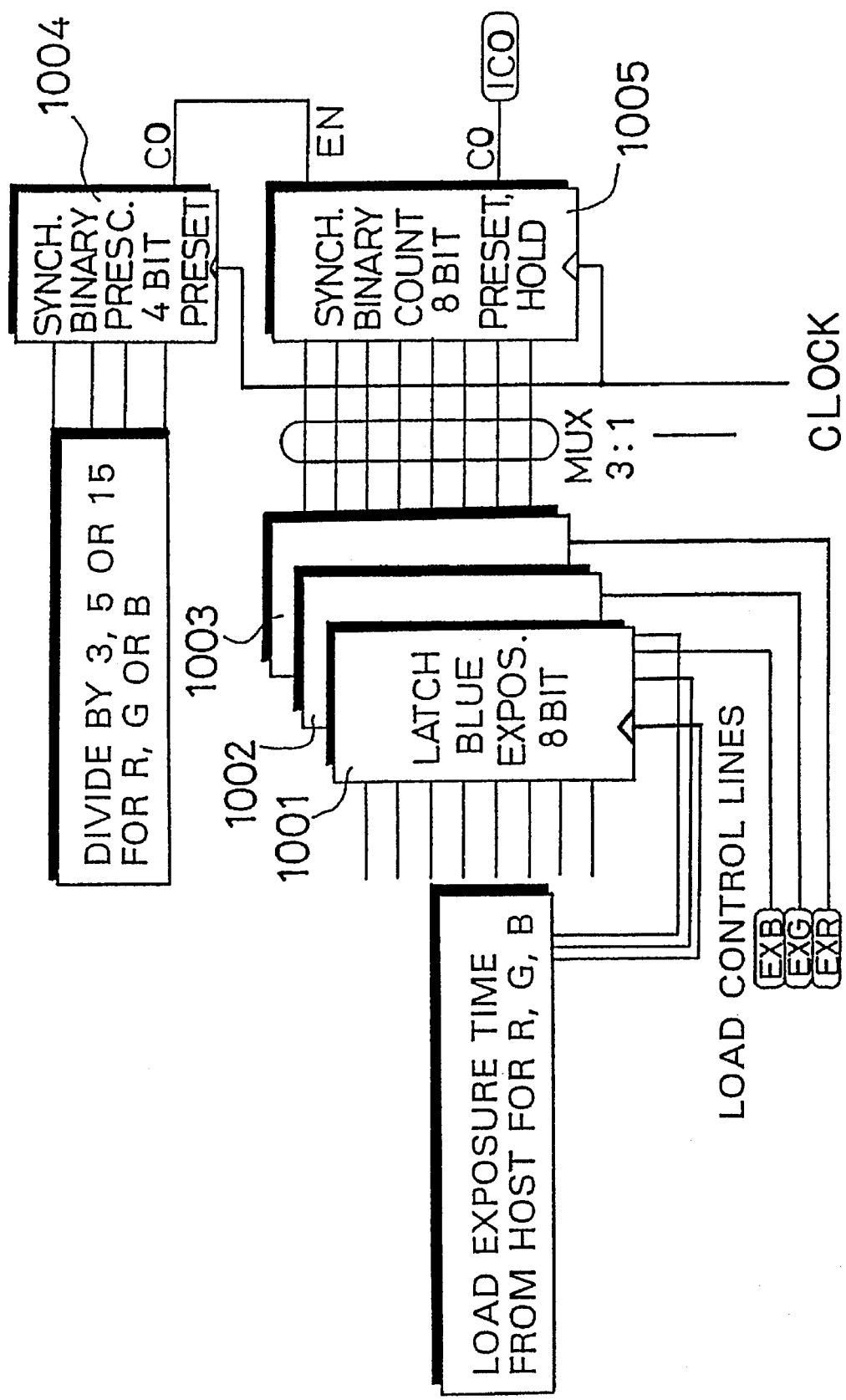
FIG. 10 is a block diagram of a color exposure time control circuit which is part of the preferred embodiment.

Before each scan, the three 8 bit latches 1001–1003 (FIG. 10) are loaded with the respective exposure times allotted to each color. While acquiring each scan column, an 8 bit binary counter 1005 is preset before each color interval with the value from a respective one of the latches. The prescaler 1004 is at the same time programmed to divide the clock by the respective divider value 3, 5 or 15 to compensate for the initial difference in the red, green and blue exposure intervals. The counter carry output serves as a signal "ICO" (integration control) which is applied to the CCD to control the effective exposure. In this manner, the exposure time can be varied from 1 to 240 linearly. FIG. 9 shows each color exposed at 100%. The counter 1005 is wired so as to hold its terminal count, rather than overflow. In FIG. 10, EN means the count enable, latches 1001–1003 are each a Texas Instruments 74-574 integrated circuit, and the counter 1005 and scaler 1004 are each made from Texas Instruments 74-163 integrated circuits.

Zoom in the X Direction

A key feature of the inventive system is its ability to reduce the image from a maximum of 2400×3600 pixels (10 microns per pixel) to any desired scale. This scaling operation is accomplished along the X axis (which corresponds to the 36 mm dimension of the 36 mm×24 mm transparency in the slide and which is parallel to the direction of slide movement) by adjusting the step rate of the motor 510.

The motor is controlled by the host computer with essentially two control lines. One control line, for example the least significant bit of a control register, establishes the direction of rotation of the motor. The other control line is the clock input, which defines the step rate and thereby the speed in the X direction. This clock is generated by a programmable 16-bit interval timer (not illustrated) which resides in the scanner, the timer being an Intel 8254 (or the like). This timer runs off the master clock of the scanner, which runs at 4 MHz. The exposure time for a column is typically 16 msec, as shown in FIG. 9, and thus the 250 nsec periods of the interval timer provide a fine resolution of the zoom factor in the X direction. The timer is gated so that, if the host computer cannot read scanned data fast enough, the feed of the slide is temporarily halted until the host reads the data.

Besides scaling, the location of the origin of the zoomed window is also user selectable. For the X dimension, this means that the moving slide must reach a specific location before actual data acquisitions begins. This X offset is set by the number of steps sent to the stepper driver before any output data is read.

The motor is disabled when a lip protruding from the tray 520 activates either limit switch 550 or 551 shown in FIG. 5.

Zoom in the Y Direction and Data Transfer to Host

While the zoom in the X direction can be varied in a continuous fashion, limited only by the complexity of the stepper controller, in the Y direction the pixel spacing of the CCD sensor a priori determines the digital resolution. It is therefore not possible to digitally expand and contract the spacing of the samples in a continuous way. (Only an optical zoom arrangement would allow a truly continuous variation of the magnification).

However, a discrete approximation comes very close to a continuous zoom for most cases. Many commercial document scanners are set for a maximum digitizing rate of 300 dots per inch (dpi). Typically, such a scanner would also allow the rates of 150, 100, 75 or 50 dpi, which are all integer multiples of the original pitch. These lower resolution scan rates come about by skipping one or more pixels when reading the linear image sensor.

As a first extension, it is conceivable to digitize a document at 200 dpi by applying the following readout pattern: read two elements, skip one, and so forth. This concept already extends the available scale factors, but cannot yet be considered a variable zoom, since only discrete reductions are possible.

In the preferred embodiment a new readout scheme has been developed and realized in hardware. It allows fractional scaling, as follows.

To define a given sample rate, the host computer loads a zoom control latch with the sampling period or pitch. For instance, if a 45% reduction is desired, the sampling period would be 1/0.45=2.22 . . . A readout rate generator has an adder, which accumulates this sampling period over one line interval, in particular by successively incrementing an accumulated count by this amount in the following fashion:

$$0/2.22/4.44/6.67/8.89/11.11/13.33 \ldots$$

The integer part of the output of the generator is the desired pixel. By assigning enough bits to the zoom latch and the adder, extremely accurate quantization is possible.

The system must be able to zoom into a window located anywhere in the image, or in other words start reading data from a user selected point, and thus one more step is required. This step involves establishing the offset (or base address) at which readout beings. This offset or address is loaded into a Y latch and from there is loaded into the adder at the beginning of each line. The above sequence would thus start from a value greater than zero.

Figure 11:
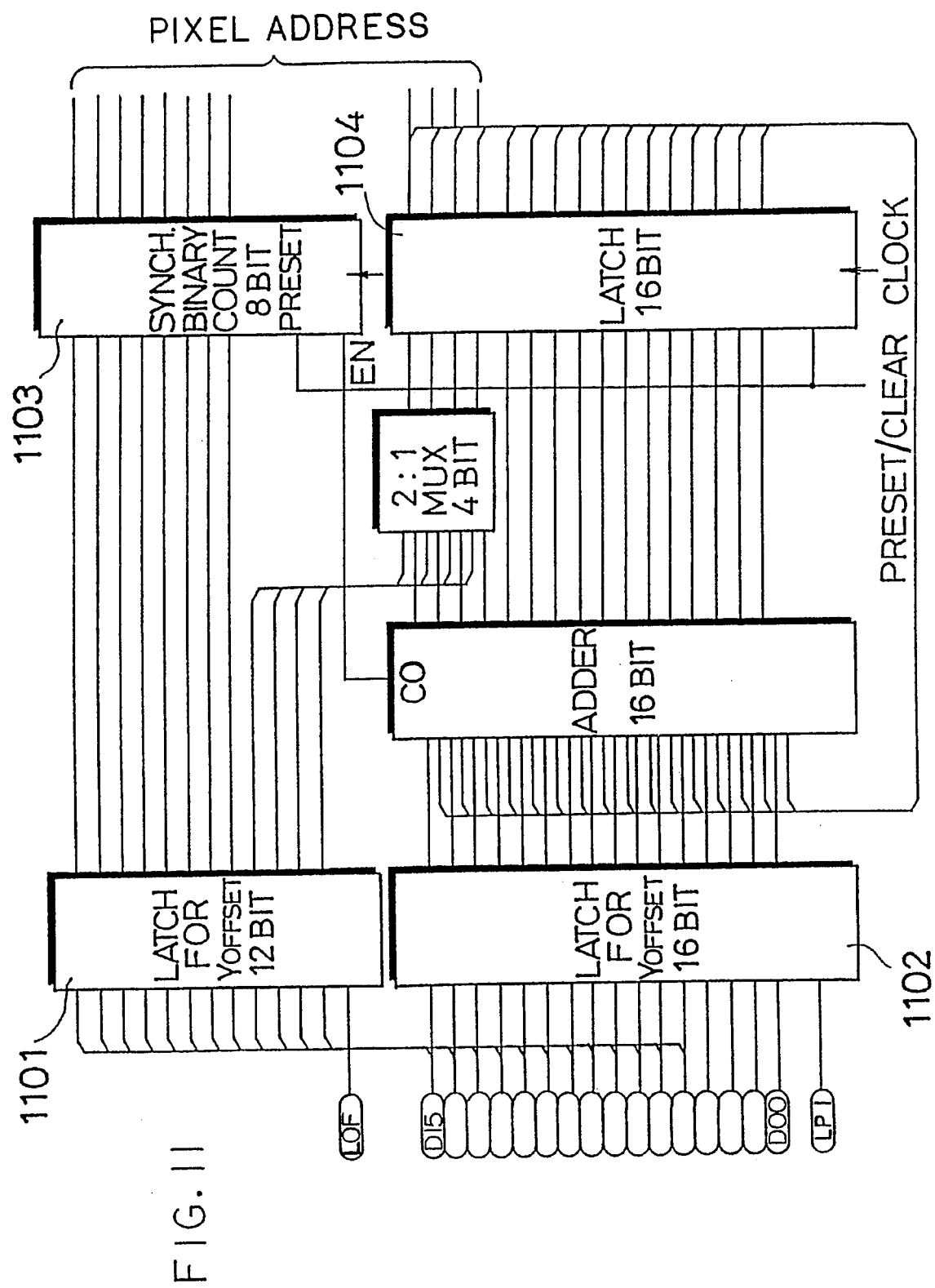
FIG. 11 is a block diagram of an address generator which is part of the preferred embodiment and facilitates a pan and zoom function.

The circuit which performs this function is shown in FIG. 11. This circuit sequentially generates the read addresses for the red/green/blue line buffers which, of course, share common address lines. The read address generator is preset from the host via a 16 bit data bus D00–D15. The strobe line "LPI" latches the pitch in latch 1101, and the line "LOF" latches the effective Y offset in latch 1102. This load needs to be performed only once, when the desired offset and zoom (readout pitch) are being entered. When the host starts to read a scan column, the 12 bit offset is loaded into an 8 bit counter 1103 and the 4 top bits of a 16 bit latch 1104, while the 12 lesser bits of latch 1104 are set to zero. This start address points to the first buffer location to be accessed. The generator is then incremented upon each clock pulse, namely each access from the host. More specifically, an adder 1005 adds the 16 bit pitch in latch 1102 to the 16 bit accumulated sum in latch 1104, and the result is loaded back into latch 1104, while the carry out from the adder (if any) increments the counter 1103. The S-bit output of counter 1103 and the top 4 bits of latch 1104 make up the actual read address for the RGB buffer. This buffer is three 8k×8 RAM chips shown at 803, 804 and 805 in FIG. 8. The read addresses are multiplexed with write addresses from a write address counter, which essentially counts the pixels in the CCD sensor.

It thus becomes clear that all the host has to do is to send a scale word to the scanner, which in turn generates the desired rate and provides the color data in the desired format at the output latch (809–810). The interaction between the host and the scanner is timed in such a way that a new output is always generated faster than the host computer can accept the prior byte or word of information. The scanner will wait, before proceeding to a new line of data, if the host cannot keep up with reading the data.

Due to the long exposure time required for acquisition of the blue spectral band, this asynchronous data transfer concept has enough latitude to always work very efficiently, getting the data into the host at the highest possible rate, as shown in FIG. 9.

Sample Rate Dependent Focus Resp. Defocus

Since in many cases the user selects for the slide to be imaged a window which corresponds to a low magnification, the resulting spatial sample rate after zoom is inadequate. Aliasing or Moire artifacts would occur. These are highly undesirable and must be eliminated. One way to do so would be to sample the image at the highest resolution, given by the element spacing of the CCD, and then digitally filter and down sample the image. This approach is cumbersome since it calls for a computationally intensive operation (area filters with kernels up to 7×7 pixels). Also, this filtering must either be done "on the fly" using fast dedicating hardware or "off-line" using a large memory (typically a hard disk) to temporarily store the unprocessed image. Since a primary goal of the present invention is to provide an affordable and rapid scanning system, the above approaches are not acceptable.

In the inventive embodiment, the spatial filtering is accomplished in the optical domain. The image is artificially defocused or "blurred" before the limited resolution sampling takes place. Defocusing can be accomplished in a variety of ways.

Referring to FIG. 6, one approach is to shift the sensor 641 out of the focal plane. The image forming lens 631 could be shifted in a similar fashion. Both approaches are difficult to implement since they require precise linear bearings and accurate control of minute displacements. A more elegant approach involves controlling the position of the upper first-surface mirror 621 using a drive mechanism (not shown). In a similar fashion, the image-forming path can be lengthened or shortened by selectively inserting a prism or wedge 661 (FIG. 6).

Such an arrangement can also be used for focusing, but experiments have shown that the majority of slide frames accurately center the film.

In a simple version, just two positions (focus and defocus) are provided, corresponding to the two most often used magnifications. The actuator for the focus is implemented in the inventive low cost system by mechanically linking the defocusing element to the screw 511 or the tray 520 with a friction coupling, so that one focus position is established during tray pull-in and the other during tray push-out. For example, the defocusing wedge 661 can, in the simplest arrangement, be switched into and out of the optical path by a conventional friction clutch 662, which is engaged with a non-threaded portion of the lead screw 511. Two not-illustrated stops would be provided to limit movement in respective directions. Since the direction of rotation of the screw changes between forward and reverse scanning, the wedge 661 will either be moved up (out of the way) or down (into the optical path). Element 661 could alternatively be a conventional "softar" of the type which is widely used as a camera or enlarger accessory and which is basically an array of tiny wedges.

Regardless of the physical implementation, the primary goal is the reduction of spatial bandwidth of the image to match the sampling frequency.

Hardware for Equalization

Along with the stated goal of rapid scanning goes the need for dedicated hardware to compensate for any non-uniformity of the signal produced by the CCD sensor.

Three sources cause significant non-uniformity in the output voltage of the sensor:

1) The illumination optics do not yield a 100% uniform irradiance along the line of focus 622. Typically, the intensity falls off toward the edges. One cause of this problem is spherical aberration caused by the toroidal mirror 611.

2) The sensor 641 itself exhibits a considerable amount of element-to-element response non-uniformity. This parameter, often termed PRNU, is in the order of 10% of the saturation output voltage.

3) In the scheme employing two or three LEDs, there are three spatially distinct sources. It is therefore necessary to compensate for non-uniformity on a per color basis. The RAM 801 (as explained below) can therefore hold three sets of equalization coefficients.

The first problem could be overcome by appropriate baffles "shading" the illumination light bundle. Their placement is critical and they also affect the resolution in the transport dimension of the slide. The second problem needs a "personality module" to account for the repetitive but spatially random non-uniformity.

Figure 8:
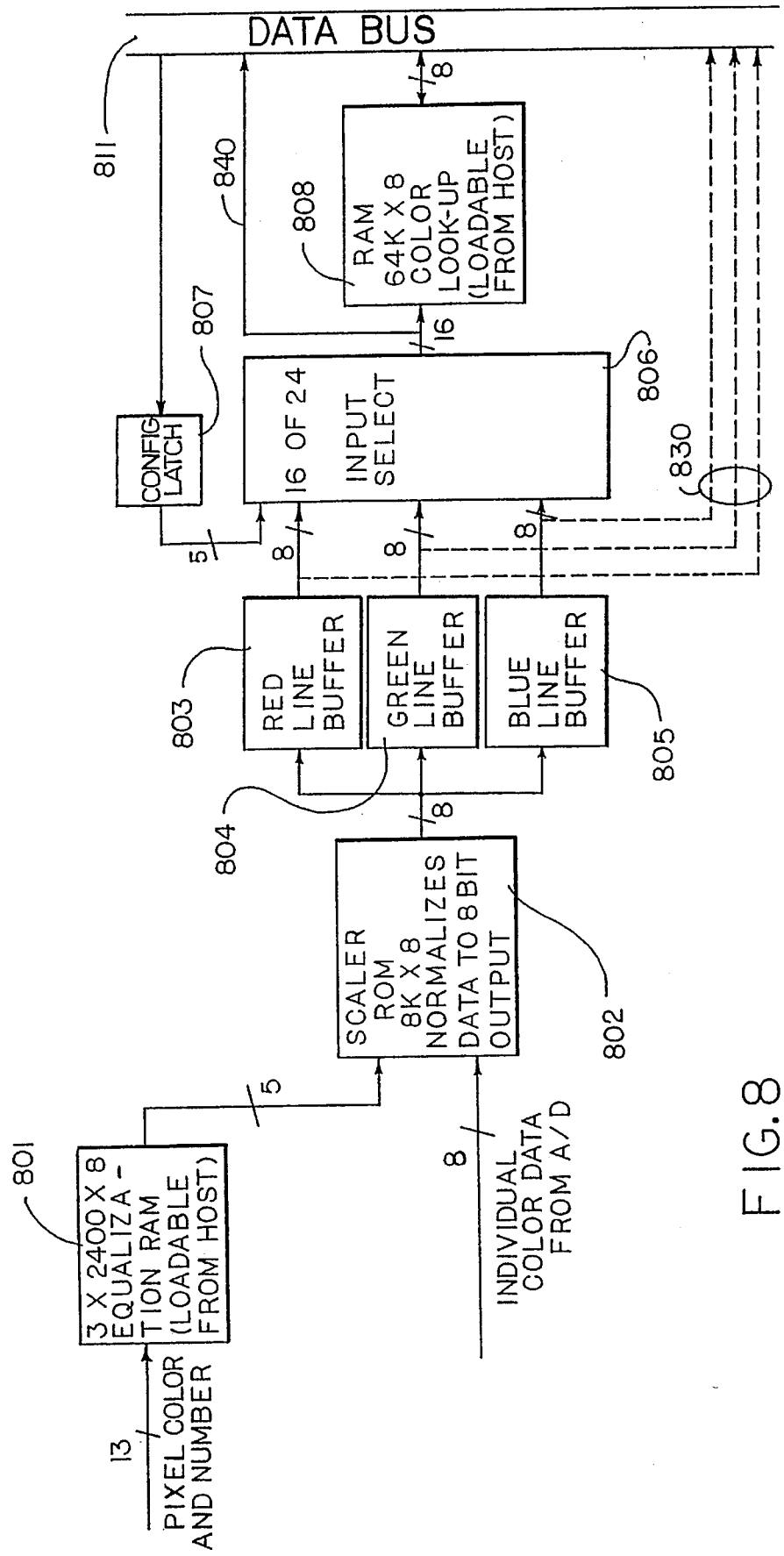
FIG. 8 is a block diagram of a portion of a circuit of the preferred embodiment, and depicts a data path from digitized image data to an input/output port of the host computer.

In the preferred embodiment a combination of a random access table 801 (FIG. 8) and a read-only table 802 compensates for both effects. FIG. 8 shows the relevant section of the circuit diagram. The output from the sensor, after being digitized and multiplexed, becomes the 8 lower address bits for an 8k×8 ROM 802, which performs a scaling function.

The five higher address lines originate from an equalizing RAM 801. This RAM can be loaded by the host computer with calibration data acquired at the time of system manufacture or installation. This data is a coded representation of the scale factor (factors ranging for example from 0.75 to 1.0), assigned to each individual pixel of the sensor for each of the three primary colors. The code is used to reduce the number of required bits and is, of course, interpreted by the scaler ROM. The scale factors account for both illumination non-uniformities and sensor non-uniformities in the particular system.

Hardware for Color Look-up

The second piece of dedicated hardware is another RAM 808, which is loadable from the host. The circuit described below establishes a transform which reduces the number of input bits from 8 bits per color (24 bit total) to a smaller number, typically 8 or 16 bits.

Up to the red line buffer 803, green line buffer 804, and blue line buffer 805, the data is a maximum of 8 bits per color. One essential feature of the system is its ability to produce this triplet in a rapid line-by-line fashion. This allows the immediate combination of the three separate colors with line buffers as opposed to page buffers. (If three separate passes were required as in existing scanners, the amount of storage needed would be huge, for example several Mbyte per color). The color compression is the process of reducing the number of bits from 24 down to some smaller number (for example 16, 12, 8, 4, or 1). This task can be done exclusively with the hardware, by simply loading data representing the transformation formula into the color lookup table 808 and into a configuration latch 807 which controls an input selector 806.

Input data of 24 bits would require a 16M table ($2^{24}$), which is uneconomic. The inventive system therefore reduces the size of this table by limiting the number of input lines. For example, by reducing the number from 24 to 16, only a 64k table ($2^{16}$) is needed. Of these 16 bits, a typical distribution assigns 6 bits to green, 5 bit to red and blue. In addition, some users desire 6 green, 6 red, and 4 blue as an alternative distribution. If 24 bits have to be transferred to the host, on the other hand, the 8 bit lines from buffers 803–805 bypass the table 808, as shown diagrammatically at 830.

The selection and assignment of input lines to table 808 is done by the input selector (multiplexor) 806. For each of the 16 address lines, there is a four to one multiplexor such as a Texas Instruments 74153. The configuration latch 807 holds 5 bits which can provide an appropriate 2 bit select code for each multiplexor to provide a distribution such as the two distributions just mentioned.

Alternatively, the table 808 can be located in the RAM of the host, in which case the 16 bit output of selector 806 is transferred over the data bus as shown diagrammatically at 840. The host will read each pixel (the address determined by the hard-wired read address generator). The 16-bit value read is then used as an index to address the table. The output of this table (which table is functionally identical to 808) is then the compressed color value representing the output of the inventive system. This data can then be transferred to the display memory, to disk, or to some other storage device.

It should be noted that, in addition to the described input color table 808, a second color table exists on the host computer display card. (The display card is not part of the invention, but must be loaded with the proper colors). This table eventually drives the red/green/blue guns of the monitor. This unit is, of course, a standard part of any conventional graphics card. It mentioned here, however, because when storing an image, both tables (input compression and output color look-up) must be stored along with the actual image data. The second table essentially performs a function opposite to the first table.

In another context a purely monochrome original is scanned. In this case it is desirable to allow the selected channel e.g. green to pass with full 8 bit resolution.

If full 24 bit color representation is desired, the data can be presented on a color per color sequential basis, assuming that the data bus is limited to either 8 or 16 bits anyway.

Typically, color compression in the manner just described is sufficient. However, as described in more detail later, it is also possible to carry out software compression, which essentially involves adaptive compression. The decision regarding which compression scheme to use is a decision made by the operator. In the menu "color" (303 in FIG. 3), there is a not-illustrated selection of options which set up the scanner for the desired compression technique.

Software

Figure 3:
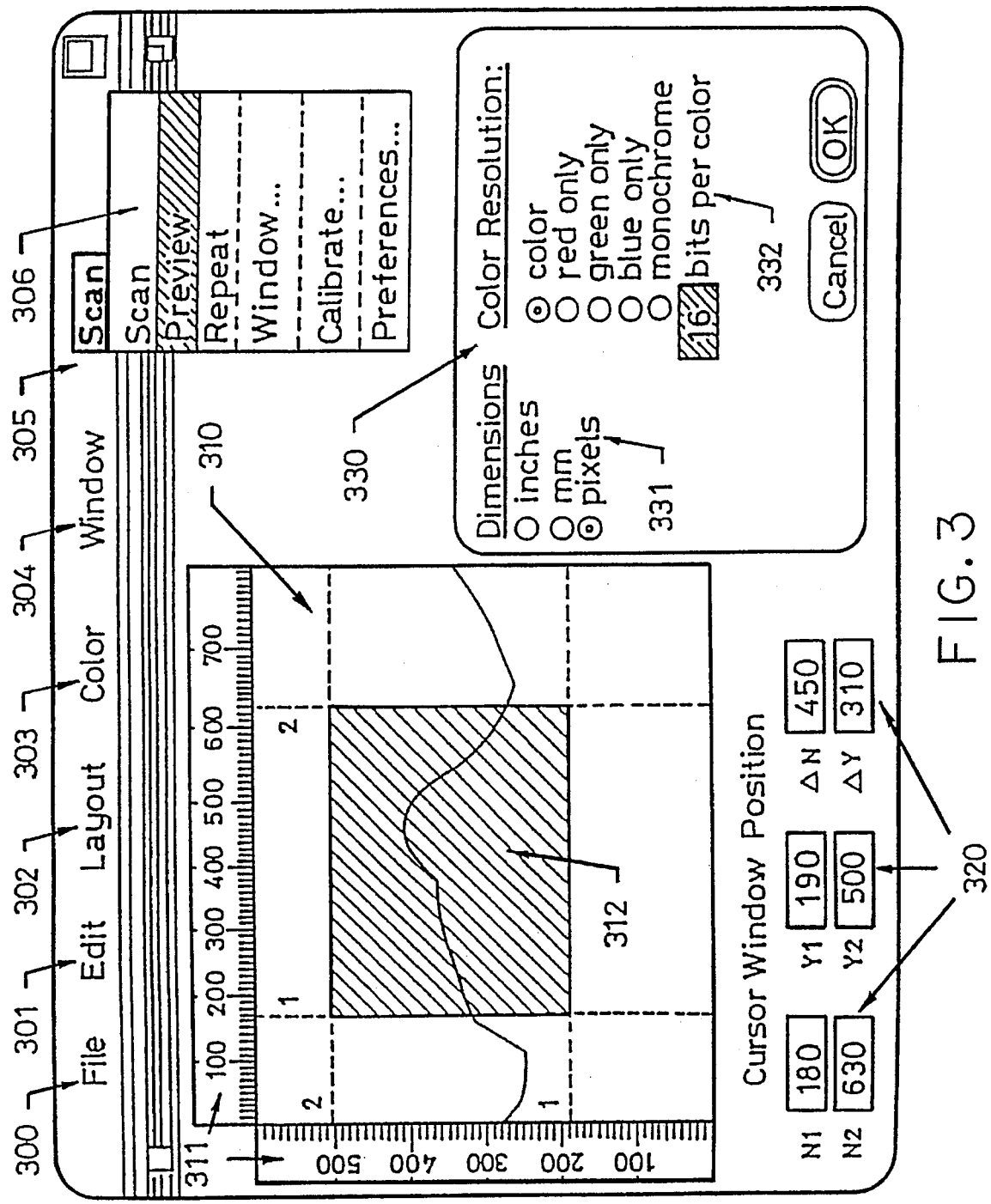
FIG. 3 is a diagrammatic view of a screen display of a host computer for the system of FIG. 2 and facilitates set-up of parameters controlling the image digitization.

A software program is used in conjunction with the scanner hardware. The software is not the focus of the present invention and is therefore not illustrated or described in detail, but is briefly discussed for purposes of clarity. This software controls the scanner hardware and allows the operator to interact with the scanning process. As shown in FIG. 3, a standard windowed environment is used as the user interface. This allows the operator to easily interact with the scanner through a menu bar 300–305 and drop-down menus 306 while viewing the actual scanned data on the same screen. From the menu bar, sub-menus 300–305 allow the user to open and close files, edit existing images, modify the layout of the window environment, control the color coding, and control the scanner.

Since the hardware produces the actual desired resolution of the output scan data, the image can be displayed in the selected window 312 as the data is being acquired from the scanner. This interface allows the scanner hardware to be readily interfaced to other popular scanning software.

From the files sub-menu 300, the operator can open a new or existing file, where files can be images, sets of images or color look-up tables. In addition, the operator can close files or rename images or sets of images input and output formats allow the user to save the images in a variety of popular image formats and compression schemes.

From the edit sub-menu 301, the operator can cut, copy and paste portions of the image by using a standard clipboard approach. In addition, special effects such as software zooming, panning rotation, mirror images and transparency creation are also available.

From the layout sub-menu 302, the operator can adjust preset conditions of the windowed environment, including display window types, presence of rulers 311, virtual memory preset conditions and positions of various message, query and help windows.

From the windows sub-menu 304, the operator can modify the windowed environment by creating new windows and film strip windows. Film strip windows simulate 4 to 5 exposure negative strips. The operator can show rulers in pixels, mm, or inches. The active image windows are stored in virtual memory allowing a wide variety of image formats.

From the color sub-menu 303, the operator can control and manipulate the color compression schemes by selecting the desired resultant color resolution and accuracy. The operator can also further optimize the performance of the compression by modifying certain preset parameters according to some a priori knowledge. It is through the color sub-menu that the operator can control the types of color mappings, including conversion from additive to subtractive color schemes for negative transparencies.

From the scan sub-menu 305, the operator can control the scanner itself, including the hardware zoom, pan and window size. From the software interface, the scanner can be reset, transparencies ejected, scanning initiated and hardware calibrated.

Optimization of Color Palette

In order to compress the color information so that the high spectral resolution of the scanner can be utilized on popular displays, it is necessary to reduce the number of colors required to faithfully represent the original image. This data reduction also allows the user to operate quickly on the image while in the computer display, while still maintaining a higher resolution image.

A wide variety of display formats and graphics requirements exist, so the operator is able to interact with the program. Specifically, the operator can preset the desired output color resolution. This allows the operator the ability to output directly to a wide variety of output resolutions including 8, 12, 16 and 24 bit color, and to control the degree of accuracy used by the program. This allows the operator to trade off between processing time and color accuracy. In addition, certain characteristics of the program can be preset by the operator to help improve the processing speed (i.e., convergence time). One such feature is the amount of data passed through the program at each iteration. A priori knowledge of the input image color homogeneity can be used to advantage. For example, if the input image has large areas of similar colors, a coarser sampling will suffice to speed up each iteration without forcing additional iterations. Conversely, a coarse sampling of a highly textured image would speed up the time per iteration while forcing additional costly iterations later in the stream. The operator can select default conditions if no a priori knowledge is available. The operator can also select color maps from similar images as good starting points for the program. This greatly improves the time to convergence.

Typically, compression is handled by the hardware of FIG. 8. However, in certain cases, it is desirable to use software to optimize the color compression. This is especially desirable when large compressions are desired such as 24-bit input to 4 or 8-bit outputs. An adaptive routine is used due to the severe data reduction required at these output color resolutions. A software program has been written which performs this compression and this software is generally similar to two commercially available software packages. These packages, called Scan Rix and T-Scan, are respectively available from Rix Softworks and from Video-Text. The Rix software package converts from 24-bit true color images in a Targa format to 8-bit VGA resolutions. The Video-Text program converts from the 24-bit Targa formats to a 4-bit color output. The techniques used for compression in the software developed for use with the inventive scanner are similar in function to these programs. There are some advantages to the software developed for the inventive scanner, but they are not considered to be a part of the present invention. The hardware of FIG. 8 can in fact perform basic compression, and in any event the conventional programs could be employed to perform basic compression. (These do require the use of an intermediate buffer. For example, the full size 24-bit color Targa formatted image is the only input accepted by these software packages.) The compression routine developed for use with the inventive scanner is therefore not described in detail, but is briefly discussed for completeness.

Figure 4:
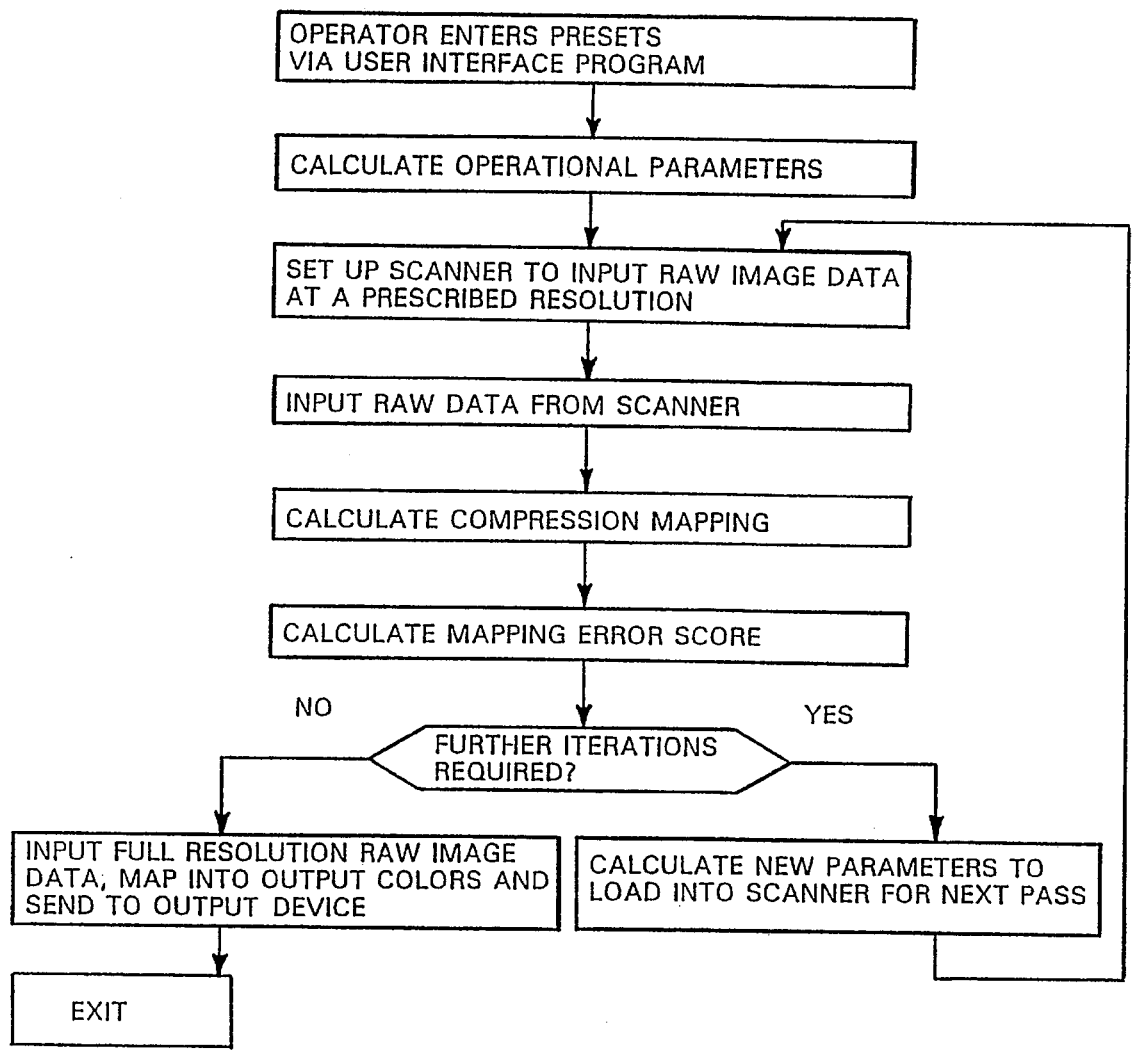
FIG. 4 is a flowchart of a color compression routine which is part of the image digitization process of FIG. 1.

The software developed for the inventive scanner controls the hardware directly as it iterates to its final solution. By relying on the raw image data in photographic form, the program can perform multiple pass digitization, eliminating the need for any full image intermediate buffers. These large intermediate files can reach sizes of up to 24-Mbytes. It is therefore of great advantage to multi-scan the image to save storage space. In addition, the scanner can read the slide at varying resolutions. This allows the compression program to scan increasing amounts of data with each iteration. This allows the program to run faster than it would if it had to access 24-Mbytes of data for each iteration. It is assumed that this 24-Mbytes of data would be stored on disk. A flowchart illustrating at a broad level the iterative compression routine is shown in FIG. 4.

In order to speed up the routine, a pyramidal approach is employed. At each iteration, the routine is subjected to increasing amounts of input data. This provides a speed improvement in the processing as well as in the time required to scan an image. Since lower spatial resolutions are sufficient for the early iterations of the routine, the scanner operates at a higher speed.

In order to meet the varying desired accuracy requirements, a recursive technique is employed which iteratively improves the accuracy of the mapping through each iteration of the routine. At each iteration, the accuracy of the mapping is measured and the routine iterates until the accuracy is above a desired limit, or until the routine stops improving with further iterations.

An error measure is used which can quantify the performance of the routine. This error measure is based on the accumulated difference between the actual input 24-bit color and the output mapped color for each pixel in the image. A perfect mapping would have 0 error. The red, green and blue components of the color of each pixel can be thought of as representing respective axes in a three-dimensional space. Each pixel would map to a single point in this space. An image consisting of 2400 by 3600 pixels would involve mapping 8.64 million pixels into this three dimensional space. Suppose it is desired to map the input 24-bit color pixels into an 8-bit color space. The 24-bit input space could be represented by segmenting the three dimensional cube into 256 gradations per axis. This segmentation would create small bins within the color cube. There would be 256×256×256=16.8 million possible points or bins for an input pixel to occupy in this space. The 8-bit output space would mean that the output values can only range from 0–255, namely a total of 256 values. Thus only 256 points out of the 16.8 million possible bins can be selected. A simple error measure would accumulate the distance that each of the 8.64 million input bins resides from their nearest neighbor in the 256 output bins. As the mapping gets more accurate, the accumulated distances will decrease. This is illustrated in FIG. 12.

Figure 12A:
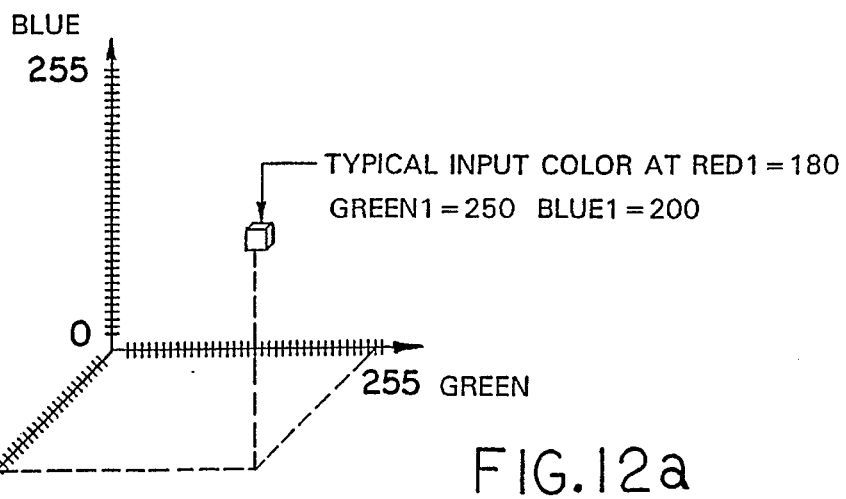
FIGS. 12a–12c are respective diagrammatic views of a cartesian coordinate system and depict a color mapping function and calculation of an error criterion associated with the mapping function.
Figure 12B:
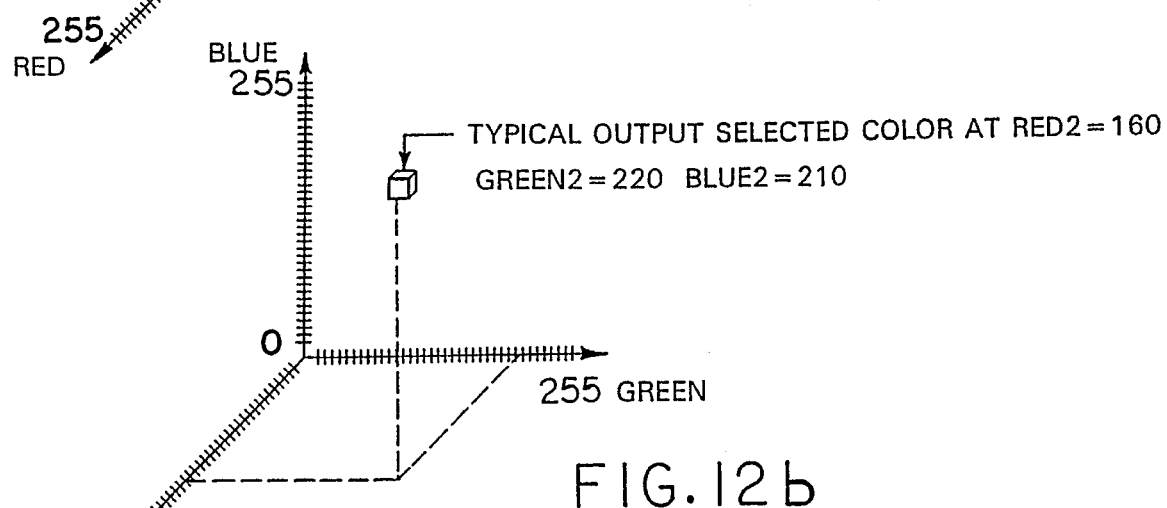
Figure 12C:
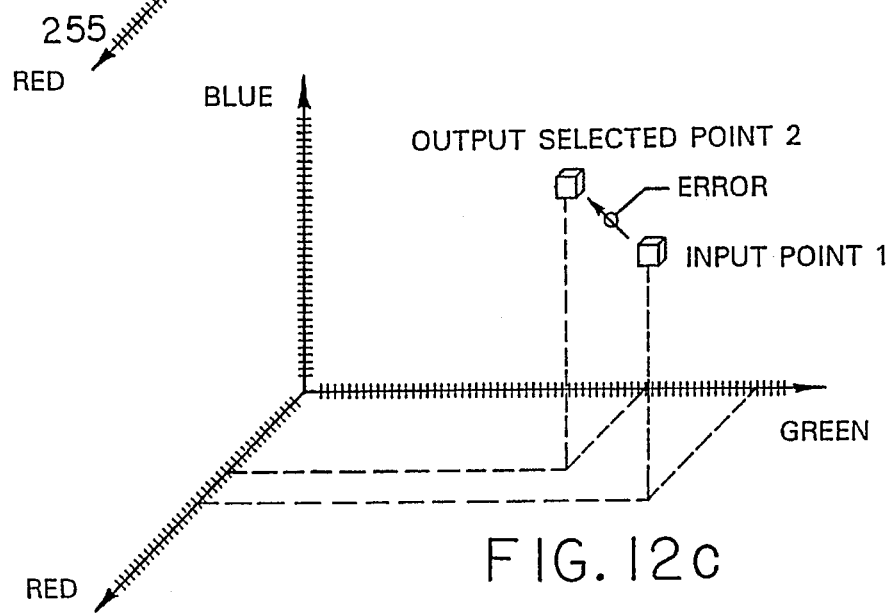

More specifically, FIG. 12a shows graphically one of 16.8 million color bins in a 256×256×256 color space which corresponds to an actually measured pixel, but this bin is not one of (for example) 256 bins selected to define the image. FIG. 12b is a similar graph showing another bin which is one of the 256 selected bins and which is the selected bin closest to the bin of space would mean that the output values can only range from 0–255, namely a total of 256 values. Thus only 256 points out of the 16.8 million possible bins can be selected. A simple error measure would accumulate the distance that each of the 8.64 million input bins resides from their nearest neighbor in the 256 output bins. As the mapping gets more accurate, the accumulated distances will decrease. This is illustrated in FIG. 12.

More specifically, FIG. 12a shows graphically one of 16.8 million color bins in a 256×256×256 color space which corresponds to an actually measured pixel, but this bin is not one of (for example) 256 bins selected to define the image. FIG. 12b is a similar graph showing another bin which is one of the 256 selected bins and which is the selected bin closest to the bin of FIG. 12a. The color bin of FIG. 12a is therefore mapped into (or in other words represented in the stored image) by the color bin of FIG. 12b, and the error due to this mapping is the distance between the bins indicated in FIG.

12c by the vector labeled ERROR. This distance is calculated mathematically as follows:

$$\underset{\text{ERROR}}{\text{Point}} = \sqrt{(\text{Red2} - \text{Red1})^2 + (\text{Green2} - \text{Green1})^2 + (\text{Blue2} - \text{Blue1})^2}$$

The total error is the sum of the mapping errors for all of the points in the input space, defined mathematically as follows:

$$\text{Total Error} = \Sigma \text{ Point ERROR (for all points in the input space)}$$

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A light source device for a scanner, comprising:

a first light emitting body for emitting a first wavelength light;

a second light emitting body for emitting a second wavelength light;

a first optical member for reflecting said first wavelength light and passing said second wavelength light; and a second optical member for reflecting said second wavelength light;

said first and second optical members being arranged so that the first wavelength light reflected by the first optical member and the second wavelength light reflected by the second optical member travel along a common optical path.

2. A light source device for a scanner comprising:

a first light emitting body for emitting a first wavelength light;

a second light emitting body for emitting a second wavelength light; and a dichroic mirror having a first reflective surface which reflects said first wavelength light and passes said second wavelength light and having a second reflective surface which reflects said second wavelength light; and said first light emitting body and said second light emitting body being arranged with respect to said mirror so that said first wavelength light reflected by said first reflective surface and said second wavelength light reflected by said second reflective surface travel along a common path.

3. A light source device according to claim 2, wherein said first light emitting body, said second light emitting body and said dichroic mirror are fixedly coupled by an optical material.

4. A light source for a scanner, comprising:

a first light emitting body for emitting a first wavelength light;

a second light emitting body for emitting a second wavelength light;

a third light emitting body for emitting a third wavelength light; and a dichroic mirror having a first reflective surface which reflects said first wavelength light and passes said second wavelength light and said third wavelength light, and a second reflective surface which reflects said second wavelength light and said third wavelength light;

said first, second and third light emitting bodies being arranged with respect to said mirror so that the first wavelength light reflected by said first reflective surface, the second wavelength light reflected by said second reflective surface and the third wavelength light reflected by said second reflective surface have a common optical path.

* * * * *